United States Patent
Ko

(10) Patent No.: US 10,009,569 B2
(45) Date of Patent: Jun. 26, 2018

(54) CLOSED CAPTION-SUPPORT CONTENT RECEIVING APPARATUS AND DISPLAY APPARATUS, SYSTEM HAVING THE SAME, AND CLOSED CAPTION-PROVIDING METHOD THEREOF

(71) Applicant: SAMSUNG ELECTRONICS CO., LTD., Suwon-si, Gyeonggi-do (KR)

(72) Inventor: Moon Joon Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 14/882,622

(22) Filed: Oct. 14, 2015

(65) Prior Publication Data
US 2016/0119571 A1    Apr. 28, 2016

(30) Foreign Application Priority Data
Oct. 24, 2014    (KR) .................. 10-2014-0145375

(51) Int. Cl.
*H04N 7/08* (2006.01)
*H04N 5/445* (2011.01)
(Continued)

(52) U.S. Cl.
CPC ....... *H04N 5/44508* (2013.01); *H04N 21/436* (2013.01); *H04N 21/439* (2013.01); *H04N 21/4516* (2013.01); *H04N 21/4884* (2013.01)

(58) Field of Classification Search
CPC .................. H04N 21/4884; H04N 21/4888
See application file for complete search history.

(56) References Cited

U.S. PATENT DOCUMENTS 7,317,908 B1 * 1/2008 Eason ............... H04M 3/53333
                                                                    379/88.14
8,695,048 B1    4/2014 Kellicker
(Continued)

OTHER PUBLICATIONS

Partial European Search Report dated Feb. 23, 2016 issued in corresponding European Patent Application 15191014.8.
(Continued)

*Primary Examiner* — Gigi L Dubasky
(74) *Attorney, Agent, or Firm* — Staas & Halsey LLP

(57) ABSTRACT

Disclosed are a closed caption-support content receiving apparatus and display apparatus, a system having the same, and a closed caption-providing method thereof, which can provide closed-caption data (CCD) suitable for a display apparatus such as a mobile device, a digital television (TV), etc. based on characteristic information of the display apparatus even though the display apparatus is not able to display the received closed-caption data. The content receiving apparatus includes a signal receiver configured to receive a video signal, an audio signal and closed-caption data of content; a communicator configured to communicate with a display apparatus; and a processor or central processing unit configured to determine characteristics of the display apparatus, convert a format of the received closed-caption data into a format compatible with the characteristics of the display apparatus based on the determined characteristics of the display apparatus, and transmit the closed-caption data having the converted format together with the video signal to the display apparatus.

42 Claims, 20 Drawing Sheets

| Header | OS INFORMATION | | | SUPPORTED CLOSED-CAPTION FORMAT | ... | Tail |
|---|---|---|---|---|---|---|
| | DEVICE INFORMATION | KIND | VERSION | | | |
| | MC605KH | iOS | 8 | WebVTT | ... | |

| Header | OS INFORMATION | | | SUPPORTED CLOSED-CAPTION FORMAT | ... | Tail |
|---|---|---|---|---|---|---|
| | DEVICE INFORMATION | KIND | VERSION | | | |
| | SPH-W770 | Android OS | 4.42 | TTML | ... | |

(51) Int. Cl.
*H04N 21/488* (2011.01)
*H04N 21/436* (2011.01)
*H04N 21/439* (2011.01)
*H04N 21/45* (2011.01)

(56) References Cited

U.S. PATENT DOCUMENTS

| | | |
|---|---|---|
| 8,763,024 B2 | 6/2014 | White et al. |
| 8,782,721 B1 | 7/2014 | Kellicker |
| 2006/0230128 A1* | 10/2006 | Chung ................ H04L 12/2807 |
| | | 709/223 |
| 2008/0129864 A1* | 6/2008 | Stone ................... H04N 7/0885 |
| | | 348/468 |
| 2010/0188566 A1 | 7/2010 | Oku |
| 2012/0143606 A1* | 6/2012 | Pham ...................... G10L 15/26 |
| | | 704/235 |
| 2014/0053223 A1* | 2/2014 | Vorobyov ............... G10L 13/00 |
| | | 725/110 |
| 2014/0109157 A1 | 4/2014 | Kellicker |
| 2014/0300813 A1* | 10/2014 | Kellicker ............ H04N 7/0882 |
| | | 348/468 |
| 2015/0213723 A1* | 7/2015 | Vattikonda ............... G09B 5/00 |
| | | 434/322 |

OTHER PUBLICATIONS

Extended European Search Report dated Jun. 6, 2016 in corresponding European Patent Application No. 15191014.8.

\* cited by examiner

FIG. 3

| Header | OS INFORMATION ||| SUPPORTED CLOSED-CAPTION FORMAT | ... | Tail |
|---|---|---|---|---|---|---|
| | DEVICE INFORMATION | KIND | VERSION | | | |
| | MC605KH | iOS | 8 | WebVTT | ... | |

FIG. 4

| Header | OS INFORMATION | | | SUPPORTED CLOSED-CAPTION FORMAT | ... | Tail |
|---|---|---|---|---|---|---|
| | DEVICE INFORMATION | KIND | VERSION | | | |
| | SPH-W770 | Android OS | 4.42 | TTML | ... | |

FIG. 8

| MANUFACTURER | PRODUCT NAME | MODEL NAME | PRODUCT NUMBER | SUPPORTED CLOSED-CAPTION FORMAT |
|---|---|---|---|---|
| A | SMART PHONE | AAA-1111 | 11111 | TTML |
| | | ⋮ | ⋮ | ⋮ |
| | TV | BBB-222 | 22222 | TTML |
| | | ⋮ | ⋮ | ⋮ |
| B | SMART PHONE | CCC-1111 | 33333 | WebVTT |
| | | ⋮ | ⋮ | ⋮ |
| ⋮ | ⋮ | ⋮ | ⋮ | ⋮ |

FIG. 13

| OS INFORMATION | SUPPORTED CLOSED-CAPTION FORMAT |
|---|---|
| iOS 8 | WebVtt |
| | : |
| | : |
| | : |

FIG. 14

| OS INFORMATION | SUPPORTED CLOSED-CAPTION FORMAT |
|---|---|
| Android OS 4.42 | TTML |
| | : |
| | : |
| | : |

CLOSED CAPTION-SUPPORT CONTENT RECEIVING APPARATUS AND DISPLAY APPARATUS, SYSTEM HAVING THE SAME, AND CLOSED CAPTION-PROVIDING METHOD THEREOF

CROSS-REFERENCE TO RELATED APPLICATIONS

This application claims priority from Korean Patent Application No. 10-2014-0145375, filed on Oct. 24, 2014 in the Korean Intellectual Property Office, the disclosure of which is incorporated herein by reference.

BACKGROUND

1. Field

Apparatuses and methods consistent with the exemplary embodiments relate to a closed caption-support content receiving apparatus and display apparatus, a system having the same, and a closed caption-providing method thereof, and more particularly to a closed caption-support content receiving apparatus and display apparatus, a system having the same, and a closed caption-providing method thereof, which can provide closed-caption data (CCD) suitable for a display apparatus such as a mobile device, a digital television (TV), etc. based on characteristic information of the display apparatus even though the display apparatus is not configured to display the received closed-caption data.

2. Description of the Related Art

Research in home network technology has been being actively carried out by many groups for industrial standards such as the digital living network alliance (DLNA), home audio-video interoperability (HAVi), universal plug and play (UPnP) and the like.

In a home network, remote user interface (RUI) technology may be used when one device controls or uses a function of another device.

The RUI technology is based on a client-server architecture, and collectively refers to technology that if a server including a content receiving apparatus such as a set-top box (STB), a personal computer (PC) and a notebook computer, etc. provides a user interface (UI), a content and the like to a client including a display apparatus such as a mobile device, a digital TV, etc. through communication, the client receives the UI, the content and the like from the server and shows the UI, the content and the like to a user so that the user of the client can use the function or content provided by the server.

However, according to the characteristics of the RUI technology, the client offers a user only a limited functionality or content within its own capability even though the server provides a variety of functions or content to the client.

For example, in a conventional broadcast receiving system where the set-top box is used as the server and the mobile device or the like display apparatus is used as the client, the client receives additional information including a video signal, an audio signal and closed-caption data which are unilaterally provided by the server through a wired or wireless module of the server, when a broadcast signal is reproduced by a TV or a video player.

In contrast to the video signal and the audio signal, additional information, in particular, closed-caption data of the broadcast signal received by the client from the server is not standardized. Therefore, a format of closed-caption data supported in an operating system of the client may be different from the format of the closed-caption data received from the server. In this case, the client cannot display a closed-caption since it is unable to process the received closed-caption data.

By the way, with improvement in rights and interests of disabilities and corresponding enactment of various disability-related legislation, a digital TV and the like display apparatus have been mandated in some locations to have a closed-caption function for a hearing-impaired person.

Accordingly, there is a need to provide the closed-caption data from the server to the client by taking the capability of the client into account in order to solve the problems of the conventional broadcast receiving system where the client may be not able to display the closed-caption in accordance with its own characteristics.

SUMMARY

An aspect of exemplary embodiments provides a closed caption-support content receiving apparatus and display apparatus, a system having the same, and a closed caption-providing method thereof, which can provide closed-caption data (CCD) suitable for a display apparatus such as a mobile device, a digital television (TV), etc. based on characteristic information of the display apparatus even though the display apparatus is not able to display the received closed-caption data.

In accordance with an exemplary embodiment, there is provided a content receiving apparatus including: a signal receiver configured to receive a video signal, an audio signal and closed-caption data of a content; a communicator configured to communicate with a display apparatus; and a processor or central processing unit configured to determine characteristics of the display apparatus, convert a format of the received closed-caption data into a format compatible with the characteristics of the display apparatus based on the determined characteristics of the display apparatus, and transmit the closed-caption data having the converted format together with the video signal to the display apparatus.

Such a content receiving apparatus determines the characteristics of the display apparatus and provides the closed-caption data having the format compatible with the characteristics of the display apparatus to the display apparatus. In result, it is possible to prevent conventional problems that the received closed-caption data is not processed due to a mismatch between the format of the closed-caption data supported by the display apparatus and the format of the closed-caption data received from the content receiving apparatus as the content receiving apparatus unilaterally offers the closed-caption data having the preset format to the display apparatus.

The processor or the central processing unit may receive characteristic information of the display apparatus from the display apparatus, and determine a closed-caption format supported by the display apparatus based on the received characteristic information. Thus, the content receiving apparatus can accurately determine the characteristics of the display apparatus.

At this time, the characteristic information may include a first closed-caption format list of informing the closed-caption formats supported by the display apparatus. The supported closed-caption formats may be varied depending on kinds and versions of an operating system of the display apparatus.

In this case, the characteristic information may be received in a form of a transmission packet including at least one of device information of the display apparatus, operating system information containing the kinds and versions of the operating system of the display apparatus, and the closed-caption formats supported by the operating system.

The content receiving apparatus may further include a storage configured to store a closed-caption format conversion table for converting the format of the received closed-caption data into one of the closed-caption formats included in the first closed-caption format list. At this time, the processor or the central processing unit may use the closed-caption format conversion table for converting the format of the closed-caption data into one of the closed-caption formats included in the first closed-caption format list. Thus, the content receiving apparatus can convert the format of the received closed-caption data into a closed-caption format compatible with the characteristics of the display apparatus.

The content receiving apparatus may authenticate the display apparatus to set a pairing connection between the display apparatus and the content receiving apparatus. Thus, the content receiving apparatus can easily exchange the video signal and the closed-caption data, and various pieces of information such as the characteristic information, etc. with the display apparatus.

In this case, alternatively, the processor or the central processing unit may determine the characteristics of the display apparatus based on the device information of the display apparatus received from the display apparatus when the pairing connection is set. The device information may include at least one of a manufacturer, a product name, a model name and a product number. Thus, the content receiving apparatus not only determines the characteristics of the display apparatus without receiving the characteristic information of the display apparatus from the display apparatus, but also determines the characteristics of the display apparatus even though the characteristic information is not received from the display apparatus.

At this time, the storage may further store a second closed-caption format list of informing the closed-caption formats supported by the display apparatus in accordance with the device information of the display apparatus. Further, the processor or the central processing unit may use the second closed-caption format list to select one of the closed-caption formats corresponding to the device information of the display apparatus, and converts the format of the closed-caption data into the selected one of the selected closed-caption. Thus, the content receiving apparatus can convert the format of the received closed-caption data into a closed-caption format compatible with the characteristics of the display apparatus.

The processor or the central processing unit may determine whether the received closed-caption data has an error, and generate a closed-caption error signal if it is determined that there is an error. The processor or the central processing unit may determine that the closed-caption data has an error if the closed-caption data is not received in the signal receiver. Alternatively, the processor or the central processing unit may determine that the closed-caption data has an error if a generation section of the closed-caption data is irregularly unmatched with a generation section of the audio signal by a predetermined percentage or higher for a predetermined period of time. In this case, the processor or the central processing unit may transmit the audio signal to one of an external voice recognition server and an internal voice recognition engine so that the audio signal can be converted into text information having a format compatible with the characteristic of the display apparatus. If there is a user's input making a request for a voice recognition service, the processor or the central processing unit may transmit the audio signal to one of an external voice recognition server and an internal voice recognition engine so that the audio signal can be converted into text information having a format compatible with the closed-caption characteristic of the display apparatus. Thus, a user can be provided with normal closed-caption data even though the closed-caption data is not received or abnormally received through the signal receiver.

The content receiving apparatus may include one among a set-top box, a personal computer and a notebook computer. The display apparatus may include at least one mobile device or at least one digital TV. Thus, various kinds of content receiving apparatus can provide the closed-caption data having the format compatible with the corresponding characteristics of various kinds of display apparatuses.

In accordance with another exemplary embodiment, there is provided a display apparatus including: a communicator configured to communicate with a content receiving apparatus; a display configured to display an image; and a processor or central processing unit configured to transmit characteristic information of the display apparatus to the content receiving apparatus through the communicator, and receive a video signal and closed-caption data, which has a format converted by the content receiving apparatus into a format corresponding to the characteristic information, from the content receiving apparatus so that the video signal and the closed-caption data can be displayed on the display.

Such a display apparatus can provide its own characteristic information to the content receiving apparatus and thus receive the closed-caption data having the format converted suitably for its own characteristics from the content receiving apparatus. In result, it is possible to prevent conventional problems that the received closed-caption data is not processed due to a mismatch between the format of the closed-caption data supported by the display apparatus and the format of the closed-caption data received from the content receiving apparatus.

The characteristic information may include a first closed-caption format list of informing the closed-caption formats supported by the content receiving apparatus. The supported closed-caption formats may be varied depending on kinds and versions of an operating system of the content receiving apparatus. In this case, the characteristic information is transmitted received in a form of a transmission packet including at least one of device information of the content receiving apparatus, operating system information containing the kinds and versions of the operating system of the content receiving apparatus, and the closed-caption formats supported by the operating system. The display apparatus may further include a storage configured to store the first closed-caption format list of the characteristic information. Thus, the content receiving apparatus exactly determines the characteristics of the display apparatus and converts the format of the closed-caption data into a format compatible with the characteristics of the display apparatus.

The processor or the central processing unit may set a pairing connection between the display apparatus and the content receiving apparatus. Thus, the display apparatus can easily exchange the video signal and the closed-caption data, and various pieces of information such as the characteristic information with the content receiving apparatus.

In this case, the processor or the central processing unit may transmit the device information for determining characteristics of the display apparatus to the content receiving apparatus when the pairing connection is set. The device information may include at least one of a manufacturer, a product name, a model name and a product number. Thus, the content receiving apparatus can determine the characteristics of the display apparatus based on the device information of the display apparatus without receiving the characteristic information from the display apparatus. In result, the display apparatus can receive the closed-caption data having the converted format compatible with its own characteristics from the content receiving apparatus without transmitting the characteristic information to the content receiving apparatus.

The display apparatus may include at least one mobile device or at least one television. The content receiving apparatus may include the set-top box, the personal computer or the notebook computer. Thus, various kinds of display apparatus can be provided with the closed-caption data having the format compatible with its own characteristics from various kinds of content receiving apparatus.

In accordance with still another exemplary embodiment, there is provided a system including: the foregoing content receiving apparatus including: a signal receiver configured to receive a video signal, an audio signal and closed-caption data of a content, a communicator configured to communicate with a display apparatus, and a processor or central processing unit configured to determine characteristics of the display apparatus, convert a format of the received closed-caption data into a format compatible with the characteristics of the display apparatus based on the determined characteristics of the display apparatus, and transmit the closed-caption data having the converted format together with the video signal to the display apparatus; and at least one display apparatus including: a communicator configured to communicate with a content receiving apparatus, a display configured to display an image; and a processor or central processing unit configured to transmit characteristic information of the display apparatus to the content receiving apparatus through the communicator, and receive a video signal and closed-caption data, which has a format converted by the content receiving apparatus into a format corresponding to the characteristic information, from the content receiving apparatus so that the video signal and the closed-caption data can be displayed on the display.

In such a system, the content receiving apparatus determines the characteristics of the display apparatus and offers the closed-caption data having a format compatible with the characteristics of the display apparatus to the display apparatus. In result, it is possible to solve conventional problems that the received closed-caption data is not processed due to a mismatch between the format of the closed-caption data supported by the display apparatus and the format of the closed-caption data received from the content receiving apparatus.

In accordance with yet another exemplary embodiment, there is provided a closed-caption providing method of a system including a content receiving apparatus that receives a video signal, an audio signal and closed-caption data of a content, and a display apparatus that communicates with the content receiving apparatus, the method including: by the content receiving apparatus, determining characteristics of the display apparatus; by the content receiving apparatus, converting a format of the closed-caption data into a format compatible with the characteristics of the display apparatus based on the determined characteristics of the display apparatus; by the content receiving apparatus, transmitting the closed-caption data having the converted format, together with the video signal, to the display apparatus; and by the display apparatus, displaying an image and a closed-caption by processing the video signal and the closed-caption data received from the content receiving apparatus.

In such a closed-caption providing method of the system, the content receiving apparatus determines the characteristics of the display apparatus and offers the closed-caption data having the format compatible with the characteristics of the display apparatus to the display apparatus. In result, it is possible to solve conventional problems that the received closed-caption data is not processed due to a mismatch between the format of the closed-caption data supported by the display apparatus and the format of the closed-caption data received from the content receiving apparatus.

The determining may include: by the display apparatus, transmitting characteristic information of the display apparatus to the content receiving apparatus; and by the content receiving apparatus, determining whether the display apparatus is able to process the closed-caption data received from the content receiving apparatus, based on the received characteristic information. Thus, the content receiving apparatus can accurately determine the characteristics of the display apparatus.

At this time, the determining whether the display apparatus is able to process the closed-caption data may include checking whether the format of the received closed-caption data belongs to a first closed-caption format list of the characteristic information; and determining that the display apparatus is able to process the received closed-caption data if the format of the received closed-caption data belongs to the first closed-caption format list, and otherwise determining that the display apparatus is unable to process the received closed-caption data. Thus, the content receiving apparatus can more accurately determine the characteristics of the display apparatus.

The converting may include: selecting a format to be converted based on the received characteristic information if it is determined that the display apparatus is unable to process the received closed-caption data; and converting the format of the received closed-caption data into the selected format. The converting the format into the selected format may include: using a closed-caption format conversion table to convert the format of the received closed-caption data into the selected format. Thus, the content receiving apparatus can convert the format of the received closed-caption data into the closed-caption format compatible with the characteristics of the display apparatus.

The transmitting may include transmitting the received closed-caption data together with the video signal to the display apparatus without converting the format of the received closed-caption data if it is determined that the display apparatus is able to process the received closed-caption data.

The closed-caption providing method of the system may further perform a pairing connection between the display apparatus and the content receiving apparatus. Thus, the content receiving apparatus and the display apparatus can exchange the video signal and the closed-caption data, and various pieces of information such as the characteristic information of the display apparatus with each other. At this time, the determining may include the characteristics of the display apparatus based on the device information of the display apparatus transmitted from the display apparatus to the content receiving apparatus when the pairing connection is set. Thus, the content receiving apparatus not only determines the characteristics of the display apparatus without receiving the characteristic information from the display apparatus, but also determine the characteristics of the display apparatus even when the characteristic information is not received in the display apparatus.

The closed-caption providing method of the system may further include determining whether the received closed-caption data has an error and generating a closed-caption error signal if it is determined that there is an error; transmitting the audio signal to one of an external voice recognition server and an internal voice recognition engine so that the audio signal can be converted into text information when the closed-caption error signal is generated; and converting the text information to have a format compatible with the characteristics of the display apparatus. At this time, the generating may include determining that the closed-caption data has an error if the closed-caption data is not received or if a generation section of the closed-caption data is irregularly unmatched with a generation section of the audio signal by a predetermined percentage or higher for a predetermined period of time, and generating the closed-caption error signal. Further, the closed-caption providing method of the system may further include: determining if there is a user's input making a request for a voice recognition service; transmitting the audio signal to one of an external voice recognition server and an internal voice recognition engine so that the audio signal can be converted into text information; and converting the text information to have a format compatible with the characteristics of the display apparatus. Thus, a user can be provided with normal closed-caption data even though the closed-caption data is not received or abnormally received through the signal receiver.

In accordance with an exemplary embodiment a server to provide closed-caption data to a client may include a communicator to receive a broadcast signal request signal and closed-caption capability ("CCC") information from the client and a hardware-based processor to control the server to convert the closed-caption data into a format corresponding to the CCC information received from the client and to control the server to provide the converted closed-caption data to the client along with content corresponding to the converted closed-caption data.

In accordance with an exemplary embodiment a method of providing closed-caption data from a server to a client may include receiving, by the server, a broadcast signal request signal and closed-caption capability ("CCC") information from the client, determining whether the client can display the closed-caption data based on the CCC information received from the client, and converting, by the server, the closed-caption data into a format corresponding to the CCC information, according to a result of the determining.

In accordance with an exemplary embodiment a method of providing closed-caption data from a server to a client may include determining, by the server, a characteristic of the client and converting, by the server, the closed-caption data into a format compatible with the determined characteristic of the client.

BRIEF DESCRIPTION OF THE DRAWINGS

The above and/or other aspects will become apparent and more readily appreciated from the following description of exemplary embodiments, taken in conjunction with the accompanying drawings, in which:

FIG. 3 and FIG. 4 show examples of a transmission packet for transmitting a client's closed-caption capability information from the client to the server;

FIG. 8 is a table showing an example of a second closed-caption format list stored in a first storage of the server;

FIG. 13 and FIG. 14 are tables showing examples of a first closed-caption format list stored in a second storage of the client;

DETAILED DESCRIPTION

Below, a closed caption-support content receiving apparatus and display apparatus, a system having the same and a closed caption-providing method thereof according to an exemplary embodiment will be described with reference to accompanying drawings.

Figure 1:
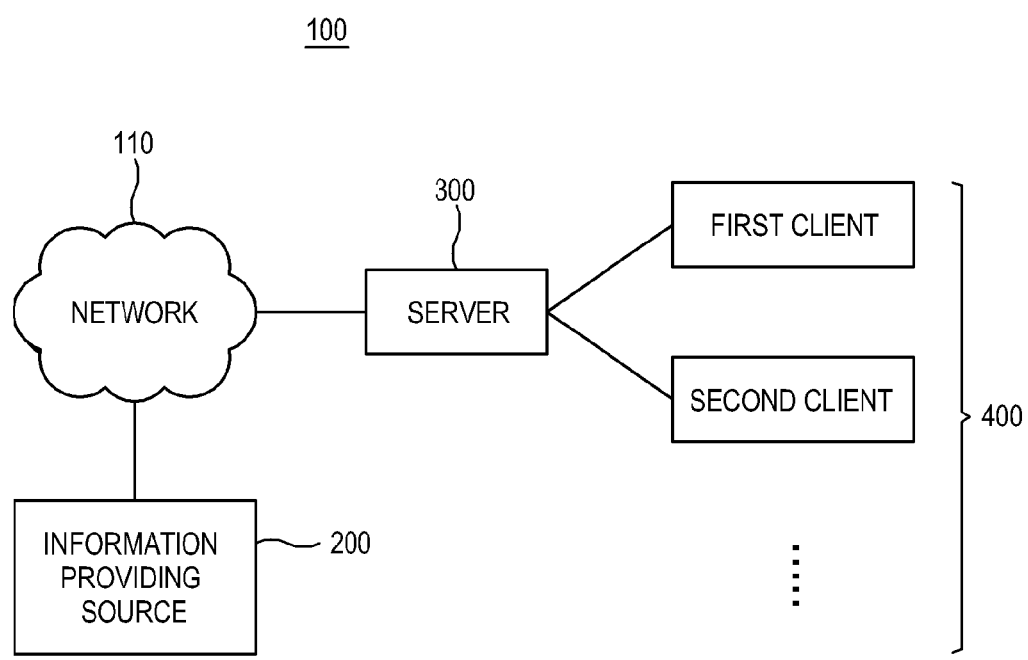
FIG. 1 is a block diagram showing a broadcast receiving system according to an exemplary embodiment.

FIG. 1 is a block diagram showing a broadcast receiving system 100 according to an exemplary embodiment.

According to an exemplary embodiment, the broadcast receiving system 100 refers to a system that supports a closed-caption function for a hearing-impaired person, a non-native speaker of the broadcast language, etc., and includes an information providing source 200, a server 300 and a plurality of clients 400 including, for example, a first client, a second client, and up to an Nth client, where N is any whole number.

The information providing source 200 is connected to the server 300 through a network 110.

The network 110 is a device or infrastructure used in performing communication to send and receive a RUI, a content, an application, a user's input, etc. between the server 300 and the information providing source 200, and may include Internet and the like wired and/or wireless network. The RUI refers to a UI page where a preset function or content provided by the information providing source 200 is displayed. The term content may refer to a moving picture, a movie and similar information that can be displayed and reproduced together with closed-captioning in the client 400. The application refers to an ordinary application program for reproducing and editing content, and implementing a game or a similar function. The term user's input refers to a command issued by a user's action and instructing the information providing source 200, the server 300 or the client 400 to perform any predetermined operation.

The information providing source 200 is a device or infrastructure that can provide content, and may include a broadcast signal transmitter or content providing server of a broadcasting station managed by a broadcaster, a cable broadcaster, an information provider or the like. Hereinafter, for convenience of description, it will be assumed that the information providing source 200 is the broadcast signal transmitter for transmitting a broadcast signal corresponding to content.

The server 300 is a content receiving apparatus for receiving content or the like from the information providing source 200 through the network 110 and providing the received content or the like to the clients 400, and may include a set-top box (STB), a personal computer, a notebook computer and the like device capable of communicating with the information providing source 200 through the network 110. Hereinafter, it will be assumed that the server 300 is the set-top box for receiving content from the information providing source 200 and providing the received content to the clients 400. Further, the set-top box used as the server 300 may receive video/audio data and packet data, a broadcast signal, or the video/the audio signal from the information providing source 200 or the connected external device in accordance with the Internet, TV or video modes, and transmit the received video/audio data and the packet data, the broadcast signal, or the video/audio signal to the client 400. For convenience of description, it will be assumed that the set-top box may receive a broadcast signal from the information providing source 200 in accordance with TV modes, and transmit the received broadcast signal to the client 400.

The server 300 and the plurality of clients 400 are connected to communicate with each other by a wire or wirelessly through first and second communicators (see '340' and '440' in FIG. 2) respectively provided in the server 300 and the clients 400.

The clients 400 are display apparatuses for receiving and displaying a broadcast signal of content from the server 300, and may include a smart phone, a cellular phone, a tablet PC, a mobile PC, a watch phone, a personal digital assistant (PDA) and other mobile devices, or a device capable of communicating with the server 300 such as a digital TV by a wire or wirelessly. Further, the clients 400 may be achieved by a plurality of devices which are the same or different in kind, for example, a plurality of mobile devices, a plurality of mobile devices/a plurality of digital TVs, etc. Below, it will be assumed that the clients 400 are smart phones capable of receiving a broadcast signal through the server 300 or performing data communication and information search through the Internet. Further, for convenience of description, one client 400 will be described as a representative of the clients 400.

Figure 2:
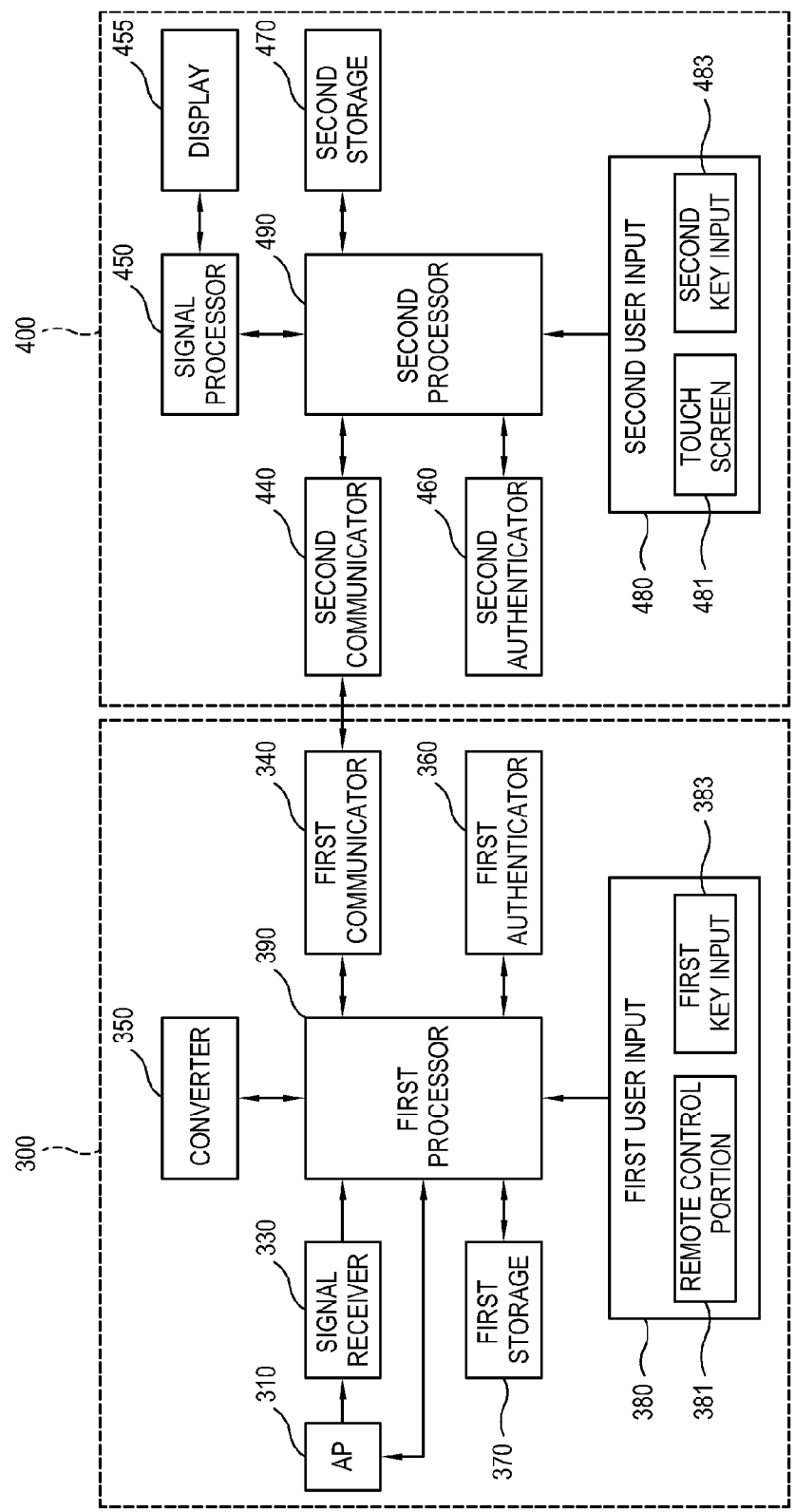
FIG. 2 is a block diagram showing a server and a client in the broadcast receiving system of FIG. 1.

FIG. 2 shows the server 300 and the client 400 included in the broadcast receiving system 100 and supporting the closed-caption function.

As shown in FIG. 2, the server 300 is the set-top box which includes, for example, a signal receiver 330, a first communicator 340, a converter 350, a first authenticator 360, a first storage 370, a first user input 380, a first processor or central processing unit (CPU) 390 (hereinafter, referred to as a 'first processor').

The signal receiver 330 connects with the information providing source 200 by a wire or wirelessly through an access point (AP) 310 such as a wired/wireless router connected to the network 110, and receives a broadcast signal and additional information from the broadcast signal transmitter of the information providing source 200. The additional information includes closed-caption data (CCD), and the closed-caption data may be received along with the broadcast signal by an in-band or an out-band.

The signal receiver 330 may be achieved by a tuner.

The first communicator 340 communicates with the second communicator 440 of the client 400 under control of the first processor 390.

The first communicator 340 receives a pairing request signal (to be described later) from the client 400 for the pairing connection between the server 300 and the client 400 to fulfill the closed-caption function according to an exemplary embodiment, and transmits an authentication challenge (to be described later) from the first authenticator 360 to the second communicator 440 under control of the first processor 390 in response to the pairing request of the client 400. Further, the first communicator 340 receives a response message from the client 300 in response to the authentication challenge.

Further, the first communicator 340 receives a broadcast signal request signal and closed-caption capability (CCC) information from the client 400 as the TV or video player (hereinafter, referred to as a 'TV player' (to be described later) of a signal processor 450 (to be described later) is executed in the client 400 after pairing the server 300 and the client 400.

The closed-caption capability information is an example of the characteristic information of the client 400, which is used for determining a closed-caption format compatible with the characteristic of the client 400 as described later with regard to the first processor 390. The closed-caption capability information may include a first closed-caption format list for informing what closed-caption formats can be processed by the client 400. The closed-caption formats supported by the client 400 may be varied depending on the kinds and versions of the operating system of the client 400.

Further, the closed-caption capability information is received in the form of a transmission packet while including the device information of the client 400, operating system information containing the kinds and versions of the operating system (OS), and/or the closed-caption formats supported by the operating system (see FIG. 3 and FIG. 4). The device information of the client 400 may involve a manufacturer, a product name, a model name and/or a product number of the client 400.

For example, as shown in FIG. 3, if the operating system of the paired client 400 is iOS, the closed-caption capability information may be received in the form of transmission packet including the model name of the client (MC605KH), the kind of operating system (iOS), the version (8), and the supported closed-caption formats (web video text tracks (WebVTT), . . . ). Further, as shown in FIG. 4, if the operating system of the paired client 400 is Android OS, the closed-caption capability information may be received in the form of transmission packet including the model name of the client (SPH-W770), the kind of operating system (Android OS), the version (4.4.2), and the supported closed-caption formats (timed text markedup language (TTML), . . . ).

Alternatively, the closed-caption capability information may be received from the client 400 simultaneously with pairing between the client 400 and the server 300 or directly after the pairing, separately from the broadcast signal request signal.

Further, the first communicator 340 transmits the broadcast signal and closed-caption data of the content to the paired client 400 under control of the first processor 390.

The first communicator 340 may be achieved by a module for short-range communication including at least one module among universal serial bus (USB), mobile high-definition link (MHL) and the like wired connection modules, and near field communication (NFC), wireless fidelity (Wi-Fi), Bluetooth, infrared data association (IrDA), Zigbee, a wireless local area network, ultra-wideband (UWB) and the like wireless connection modules. Below, for convenience of description, the first communicator 340 wirelessly connects with the second communicator 440 through a Wi-Fi module.

The converter 350 converts the format of the closed-caption data received through the signal receiver 330 into the format corresponding to the closed-caption capability of the client 400 based on the closed-caption conversion data of the closed-caption format conversion table (to be described later) stored in the first storage 370 under control of the first processor 390. The format corresponding to the closed-caption capability of the client 400 is determined by the first processor 390 based on the closed-caption capability information of the client 400 received from the client 400.

For example, if the format of the closed-caption data received through the signal receiver 330 is WebVTT supported by the operating system iOS 8 and the closed-caption formats supported by the closed-caption capability information of the client 400 received from the client 400 through the first communicator 340 include TTML supported by the operating system Android OS 4.4.2, the converter 350 converts the format of the received closed-caption data from WebVTT into TTML under control of the first processor 390. On the other hand, if the format of the closed-caption data received through the signal receiver 330 is TTML and the closed-caption formats supported by the closed-caption capability information of the client 400 received from the client 400 include WebVTT supported by the operating system iOS 8, the converter 350 converts the format of the received closed-caption data from TTML into WebVTT under control of the first processor 390.

The conversion of the closed-caption format by the converter 350 may be performed in real time under control of the first processor 390 when the first processor 390 transmits the broadcast signal and the related closed-caption data are transmitted to the paired client 400 through the first communicator 340 in response to a transmission request for the broadcast signal from the client 400 after pairing the server 300 and the client 400.

The converter 350 may be achieved by the publicly known closed-caption format conversion program for converting the closed-caption.

Alternatively, the converter 350 may be achieved by application specific integrated circuit (ASIC) designed to perform the function of the closed-caption format conversion program rather than the closed-caption format conversion program. Further, the closed-caption format conversion program may be embedded in a firmware or control program (hereinafter, referred to as a 'control program') of the first processor 390 for controlling operations of the elements 330, 350, 340, 360, 370, 380 and 390 of the server 300 rather than the separate program.

Figure 5:
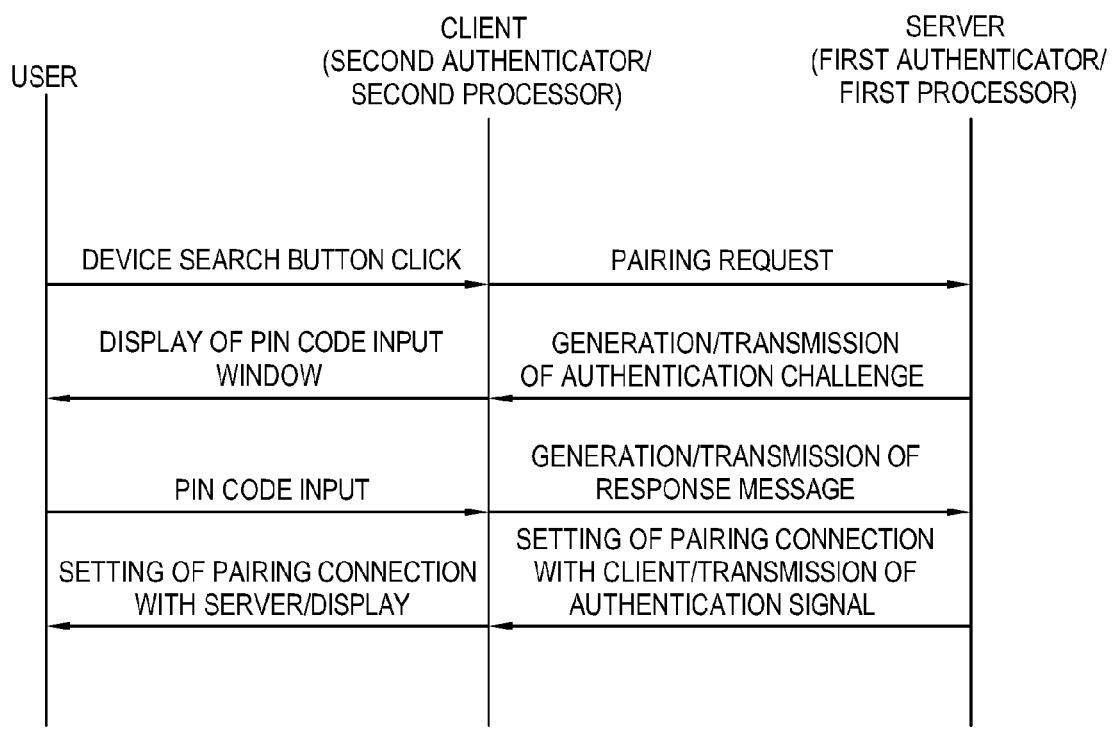
FIG. 5 is a chart showing an operational relationship among a user, the client and the server when a pairing connection between the server and the client is set.

The first authenticator 360 is to authenticate the client 400 for the pairing connection with the client 400, and generates the authentication challenge of making a request for a pin code to the client 400 under control of the first processor 390. As shown in FIG. 5, the authentication challenge is generated when the client 400 transmits the pairing request signal of requesting the pairing through the first communicator 340 as a user clicks a device search button 463 of a device search item 462 on a setting screen (see '461' in FIG. 9 to FIG. 12) to be described later. To inform the client 400 which device makes a request for the pin code, the authentication challenge includes a device name and/or address of the server. Further, the pin code previously set when manufactured is stored in the first storage 370, and published to a user of the server 300. The first processor 390 transmits the authentication challenge generated by the first authenticator 360 to the client 400 through the first communicator 340. If the pin code is input to a pin code input window (see '467' in FIG. 11) of a pairing check item 465 on the setting screen 461 generated by a second authenticator 460 based on the authentication challenge in the client 400, a second processor or a central processing unit (CPU) 490 of the client 400 transmits a response message containing the input pin code information and the device information of the client 400 to the server 400 through the second communicator 440.

The first authenticator 360 compares the pin code information input in the client 400 with the pin code information stored in the first storage 370 and determines whether they are matched, based on the response message received from the client 400 under control of the first processor 390. In the case of matching as a result of determination, the first authenticator 360 outputs the authentication signal for authenticating the client 400 to the first processor 390. The first processor 390 transmits the authentication signal output from the first authenticator 360 to the client 400 through the first communicator 340 and stores the client 400 as the paired device in the first storage 370 based on the matching or validated client information. Once the pairing connection between the server 300 and the client 400 is initially set, the pairing is automatically performed from that point on without having to repeat the authentication process. Thus, the server 300 and the client 400 can easily send and receive the broadcast signal, the closed-caption data, or a variety of pieces of information including such as the closed-caption capability information.

The first authenticator 360 may be achieved by a first authentication program programmed to perform authentication operations of generating the authentication challenge in response to the pairing request signal from the client 400, determining matching of the pin code information based on the response message of the client 400, and outputting the authentication signal.

Alternatively, the first authenticator 360 may be achieved by an ASIC designed to perform the function of the first authentication program. Further, the first authentication program need not be achieved by a separate program but may be embedded in a control program.

The first storage 370 stores the closed-caption format conversion program and the first authentication program for serving as the converter 350 and the first authenticator 360, respectively.

Further, the first storage 370 stores the device information of the client 400 and the closed-caption capability information, which are received from the client 400.

Further, the first storage 370 stores the closed-caption format conversion table to be used by the converter 350 in converting the format of the closed-caption data received in the signal receiver 330 into the format suitable for the closed-caption capability of the target client 400. The closed-caption format conversion table includes the publicly known closed-caption conversion data for converting one format to another format according to formats.

The first storage 370 may be achieved by at least one of a flash memory type, a hard disk type, a multimedia card micro type, a card type memory (e.g., SD or XD memories, etc.), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk.

The first user input 380 receives a user's input. The user's input includes a command issued to make the server 300 determine whether to perform a predetermined operation in accordance with a user's action. The predetermined operation may include an operation of controlling a basic function of the server 300 such as on/off, mode (Internet/TV/video) selection and the like, and an operation for inputting various commands and settings needed for executing the control program of the first processor 390. Such a user's command may include a remote control signal input through a remote control portion 381, and a key input signal input through a first key input 383.

The remote control portion 381 includes a remote controller (not shown) including input keys or buttons, and a remote control signal receiver (not shown) for receiving a remote control signal including key input information corresponding to a user's input from the remote controller. The remote control signal receiver transmits the remote control signal received from the remote controller to the first processor 390. The remote control signal may include a power on/off signal, a channel selection signal, a mode (Internet/TV/video) selection signal, a volume control signal, etc. The first processor 390 controls the corresponding function and/or elements in response to such a remote control signal.

The first key input 383 includes input keys or buttons formed in a front side of a case (not shown) of the server 300. The first key input 383 generates a key signal related to function control of the server in accordance with a user's input using the input key or button, and transmits the key signal to the first processor 390. The key signal may include the power on/off signals, the mode (Internet/TV/video) selection signal, etc. The first processor 390 controls the corresponding function and/or elements in response to the key signal input through the first key input 383.

The first processor 390 controls general operations of the server 300.

Further, the first processor 390 controls the first authenticator 360 as described above with regard to the first authenticator 360 and authenticates the client 400, thereby performing the operation for the pairing connection.

That is, as shown in FIG. 5, the first processor 390 controls the first authenticator 360 to form the authentication challenge for making a request for the pin code to the client 400 when receiving the pairing request signal from the client 400, and transmits the authentication challenge formed by the first authenticator 360 to the client 400 through the first communicator 340.

If receiving the response message including the pin code information and the client information from the client 400 through the first communicator 340, the first processor 390 determines whether the pin code input to the pin code input window (see '467' of FIG. 11) of the pairing check item 465 on the setting screen 461 of the client 400 is valid based on the received response message, and controls the first authenticator 360 to output the authentication signal of authenticating the client 400. The client information may include information on a par with the device information of the client 400, used in the closed-caption capability information of the client 400, that is, the manufacturer, the product name, the model name, and/or the product number of the client 400.

When the first authenticator 360 outputs the authentication signal, the first processor 390 transmits the output authentication signal to the client 400 through the first communicator 340 and stores the client 400 as the paired device in the first storage 370 based on the client information.

Further, if the broadcast signal request signal and the closed-caption capability information of the client 400 are received from the client 400 as the TV player of the signal processor 450 is executed in the client 400 after pairing the server 300 and the client 400, the first processor 390 controls the converter 350 to convert the closed-caption data received through the signal receiver 330 in accordance with the closed-caption capability of the client 400 and transmits the converted closed-caption data to the client 400 as described above with regard to the converter 350.

Figure 6:
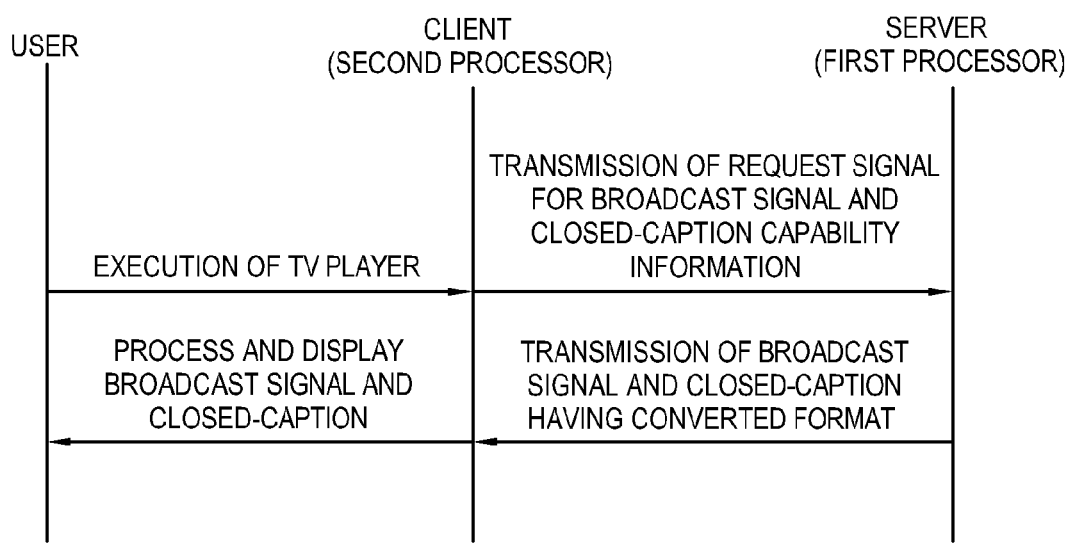
FIG. 6 is a chart showing an operational relationship among a user, the client and the server when a closed-caption is provided based on the closed-caption capability information of the client.

That is, as shown in FIG. 6, if the client 400 transmits the broadcast signal request signal and the closed-caption capability information of the client 400 as a user executes the TV player of the signal processor 450, the first processor 390 determines whether the client 400 is able to process the closed-caption data received through the signal receiver 330 based on the received closed-caption capability information of the client 400. At this time, the determination of whether the client 400 is able to process the received closed-caption data may be achieved by checking whether the format of the closed-caption data received in the signal receiver 330 belongs to the supported closed-caption format included in the closed-caption capability information of the client 400 received from the client 400. That is, the first processor 390 determines that the client 400 is able to process the received closed-caption data if the format of the received closed-caption data belongs to the closed-caption capability information of the client 400, and otherwise determines that the client 400 is unable to process the received closed-caption data. Thus, the first processor 390 can accurately determine the closed-caption capability of the client.

If it is determined that the client 400 is unable to process the received closed-caption data, the first processor 390 selects one among the supported closed-caption formats of the closed-caption capability information as a format suitable for the closed-caption capability of the client 400. The first processor 390 reads the closed-caption conversion data for converting the format of the received closed-caption data into a selected closed-caption format from the closed-caption format conversion table stored in the first storage 370, and controls the converter 350 to convert the format of the received closed-caption data into the selected format. Thus, the first processor 390 can convert the format of the closed-caption data received from the client 400 into the closed-caption format suitable for the closed-caption capability of the client 400.

Then, the first processor 390 transmits the closed-caption data having the converted format, together with the broadcast signal, to the client 400 through the first communicator 340. At this time, if the closed-caption data is an in-band closed-caption, the first processor 390 may transmit the broadcast signal including the in-band closed-caption of before the conversion and the in-band closed-caption having the converted format to the client 400. Further, if the closed-caption data is an out-band closed-caption, the first processor 390 may transmit the broadcast signal, and the out-band closed-caption having the converted format to the client 400.

The first processor 390 may operate by executing the control program.

Further, in accordance with designs, the first processor 390 may further include a nonvolatile memory such as a flash memory or the like for storing the control program, and/or a volatile memory such as a DDR for loading at least a part of the stored control program so as to be quickly accessed by the processor or CPU. At this time, if the first processor 390 does not include the nonvolatile memory, the control program may be stored in the first storage 370.

In the foregoing embodiment, the server 300 is the set-top box, but not limited thereto. For example, the server 300 may be a personal computer, a notebook computer, etc. on the same configuration and principle.

Further, in the foregoing embodiment, the server 300 converts and provides the closed-caption data to have a format suitable for the closed-caption capability of the paired client 400 and provides the converted closed-caption data if receiving the broadcast signal in the TV mode, but not limited thereto. For example, on the same configuration and principle, the server 300 may convert the related closed-caption data received as the additional information to have a format suitable for the closed-caption capability of the paired client 400 and provide the converted closed-caption data if receiving video/audio data of content and packet data or video/audio signals from the information providing source 200 or the connected external device in the Internet mode or the video mode.

Further, in the foregoing embodiment, the server 300 provides the closed-caption data suitable for the client 400 to only one client 400, but not limited thereto. For example, on the same method and principle, the server 300 may provide the closed-caption data suitable for the respective clients 400 in response to a request of each client 400 if the plurality of clients 400 are paired with the server 300.

Further, in the foregoing embodiment, the server 300 determines the closed-caption capability of the client 400 based on the closed-caption capability information of the client 400, received from the client 400, but not limited thereto.

Figure 7:
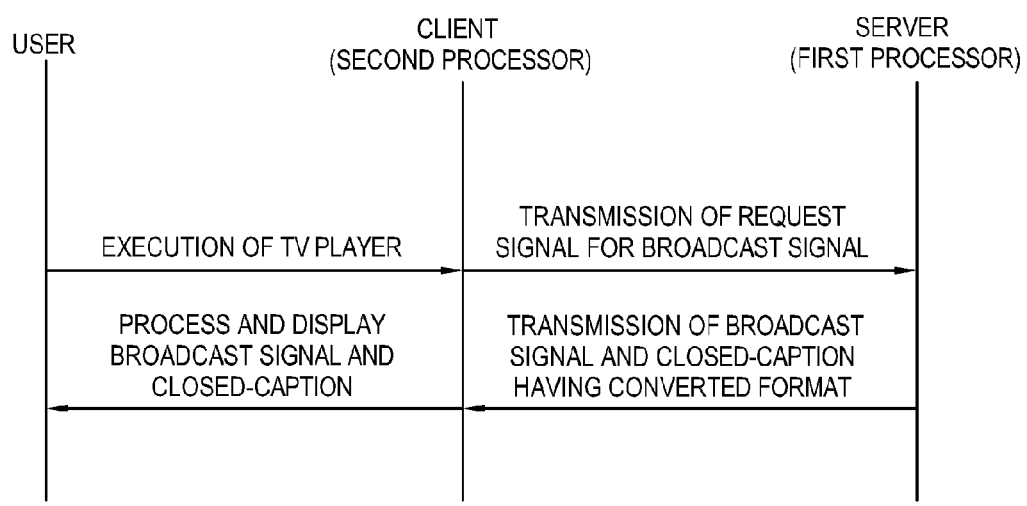
FIG. 7 is a chart showing an operational relationship among a user, the client and the server when a closed-caption is provided based on device information of the client.

For example, the first processor 390 of the server 300 may determine the client's closed-caption capability based on the device information of the client 400 included in the response message received from the client 400 when the pairing connection with the client 400 is set. At this time, as shown in FIG. 7, the first processor 390 does not receive the closed-caption capability information of the client 400 from the client 400, but receives only the broadcast signal request signal when the TV player of the signal processor 450 is executed in the client 400.

Further, the first storage 370 may further store a second closed-caption format list for informing the closed-caption formats, by which the closed-caption data can be processed, based on the device information of the client 400. At this time, as shown in FIG. 8, the second closed-caption format list may be stored in a form that the supported closed-caption formats are listed in accordance with the manufacturer of the client 400, the product name, the model name, and the product number.

Further, the first processor 390 uses the second closed-caption format list to select one among the closed-caption formats corresponding to the manufacturer, the product name, the model name, and/or the product number included in the device information of the client 400, and controls the converter 350 to convert the format of the closed-caption data into one of the selected closed-caption formats.

Thus, the server 300 not only determines the closed-caption capability of the client 400 without receiving the closed-caption capability information from the client 400, but also determines the closed-caption capability of the client 400 even though the closed-caption capability information is not received from the client 400.

Referring back to FIG. 2, the client 400 is a smart phone, and includes the second communicator 440, the signal processor 450, a display 455, the second authenticator 460, a second storage 470, a second user input 480, and a second processor or a central processing unit (CPU) 490 (hereinafter, referred to as a 'second processor').

The second communicator 440 communicates with the first communicator 340 of the server 300 under control of the second processor 490.

The second communicator 440 exchanges a user's input and information about an analysis result of the user's input with the server 300 under control of the second processor 490.

Further, the second communicator 440 transmits a pairing request signal to the server 300 under control of the second processor 490. The pairing request signal is generated when a user presses a device search button 463 of a device search item 462 on the setting screen 461 of the second authenticator 460 in order to receive and view a broadcast signal from the server 300 by pairing the client 400 and the server 300.

Further, the second communicator 440 receives the authentication challenge from the server 300 in response to the pairing request of the client 400.

Further, the second communicator 440 transmits the broadcast signal request signal together with information about the closed-caption capability of the client 400 to the server 300 under control of the second processor 490 when a user executes the TV player of the signal processor 450 after pairing the client 400 and the server 300. As described with reference to FIG. 3 and FIG. 4, the closed-caption capability information may be transmitted in the form of the transmission packet including the device information of the client 400, the operating system information including the kind and version of the operating system, and/or the closed-caption formats supported by the operating system. Alternatively, the closed-caption capability information may be transmitted to the server 300 simultaneously with or directly after pairing the client 400 and the server 300, separately from the broadcast request signal.

Further, the second communicator 440 receives the broadcast signal and the closed-caption data converted to have a format suitable for the closed-caption capability of the client 400 from the server 300 in accordance with a request for the broadcast signal.

Like the first communicator 340, the second communicator 440 may be achieved by a module for short-range communication including at least one module among USB, MHL and the like wired connection modules, and NFC, Wi-Fi, Bluetooth, IrDA, Zigbee, a wireless local area network, UWB and the like wireless connection modules. Like the first communicator 340, it will be assumed below that the second communicator 440 is achieved by the Wi-Fi module.

The signal processor 450 processes the broadcast signal and the closed-caption data, received from the exterior, for example, the server 300 under control of the second processor 490 so that the processed image and closed-caption can be displayed on the display 455. The signal processor 450 may have functions such as decoding, image enhancing, scaling, etc.

Further, the signal processor 450 processes an audio signal separated from a broadcast signal by a demultiplexer (not shown) and outputs the processed audio signal through a loudspeaker (not shown).

The signal processor 450 may be achieved by the TV player and the like application capable of processing the broadcast signal and the closed-caption data to be displayed on the display 455. Alternatively, the signal processor 450 may be achieved by an ASIC designed to perform the function of the TV player. Further, the signal processor 450 may be embedded in a firmware or operating system (hereinafter, referred to as an 'operating system') for controlling the operations of the elements 440, 450, 455, 460, 470, 480 and 490 of the client 400, rather than a separate application.

The display 455 displays an image based on a video signal processed by the video processor 450.

Further, the display 455 converts video data including various moving and still pictures, texts of limited numerals, status information, etc. received from the second processor 490 into analog signals and displays the converted data as the operating system, the control program, the application, etc. are executed while the client 400 operates. That is, the display 455 may provide various screens corresponding to use of the client 400, for example, a locked screen, a home screen, an application running screen, a menu screen, a message writing screen, a call screen, an Internet screen, a keypad screen, etc.

The display 455 may be achieved by a flat panel display such as a liquid crystal display (LCD), an organic light emitted diode (OLED), an active matrix organic light emitted diode (AMOLED), etc.

The second authenticator 460 may be used to authenticate the client 400 with respect to the server 300 for the pairing connection between the server 300 and the client 400, and to generate a pairing request signal making a request for pairing with the server 300 under control of the second processor 490 as shown in FIG. 5. Further, the second authenticator 460 generates a response message including pin code information and client information input by a user when receiving the authentication challenge of requesting the pin code from the server 300. Further, the second authenticator 460 checks and displays the pairing connection with the server 300 if receiving the authentication signal, which informs that the pin code input by a user is valid, from the server 300.

To this end, as shown in FIG. 9, FIG. 10, FIG. 11, and FIG. 12, the second authenticator 460 includes a second authentication program programmed to include the setting screen 461 displayed when a user clicks a setting icon (not shown) of a main menu (not shown) in the client 400. The setting screen 461 may include the device search item 462, a pairing setting item 464 and the pairing check item 465.

Figure 9:
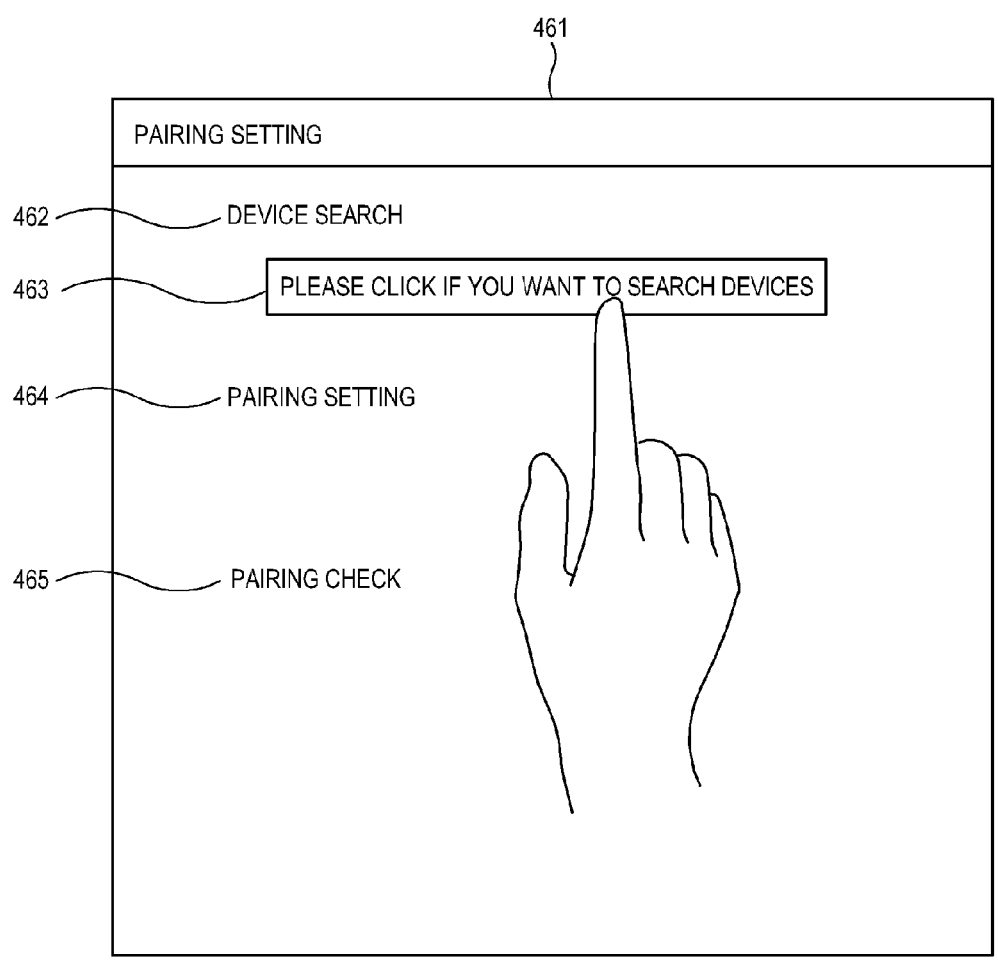
FIG. 9, FIG. 10, FIG. 11, and FIG. 12 are views showing setting screens of a second authentication program of a second authenticator for setting the pairing connection with the server in the client.

As shown in FIG. 9, the device search item 462 includes the device search button 463 for searching a device to be paired so that a user can search the server 300 to be paired. When a user presses the device search button 463 on the setting screen 461, the pairing request signal to be transmitted to the server 300 is generated under control of the second processor 490 and transmitted to the server 400 through the second communicator 440.

Figure 10:
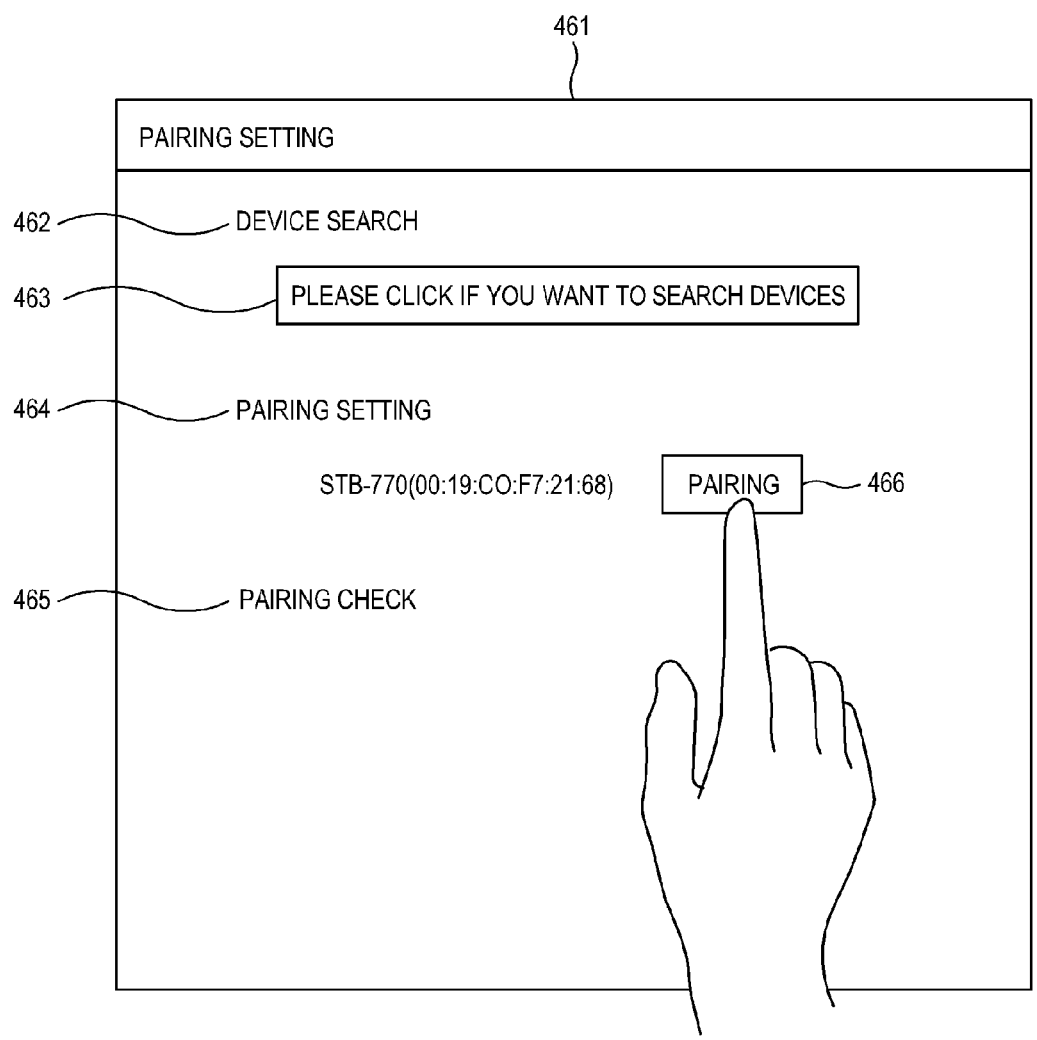

As shown in FIG. 10, on the pairing setting item 464, a device searched after a user presses the device search button 463 of the device search item 462 is activated and displayed. The searched device is represented by the device name and/or address. Further, a pairing button 466 for implementing the pairing with the searched device is displayed next to the searched device.

Figure 11:
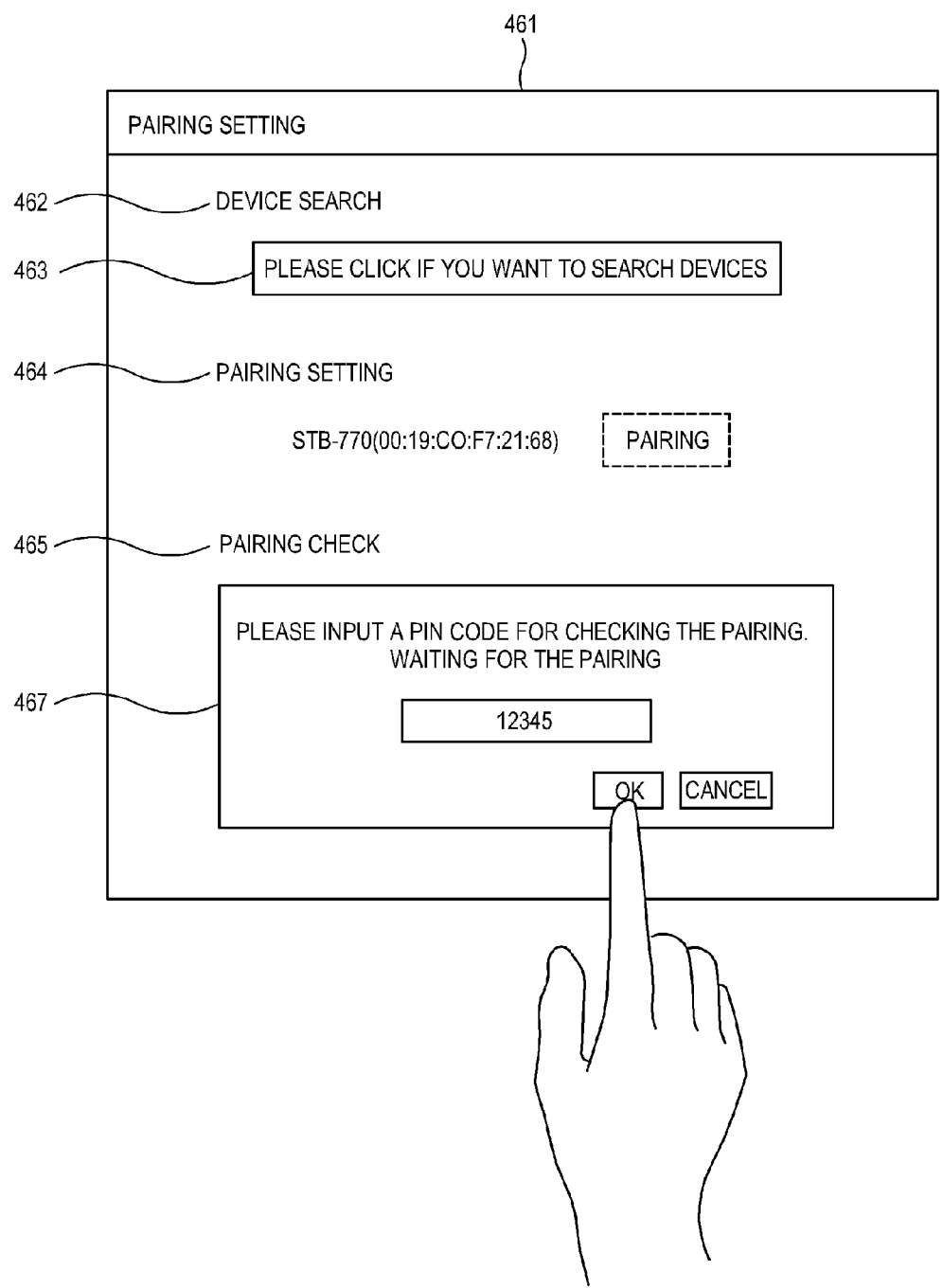

As shown in FIG. 11, the pairing check item 465 includes the pin code input window 467 displayed when the pairing button 466 of the pairing setting item 464 is pressed and receiving the input of the pin code of the searched device. When a user inputs the pin code of the server 300 to the pin code input window 467, the response message including the input pin code information and the client information is generated and transmitted to the server 300 through the second communicator 440 under control of the second processor 490.

Figure 12:
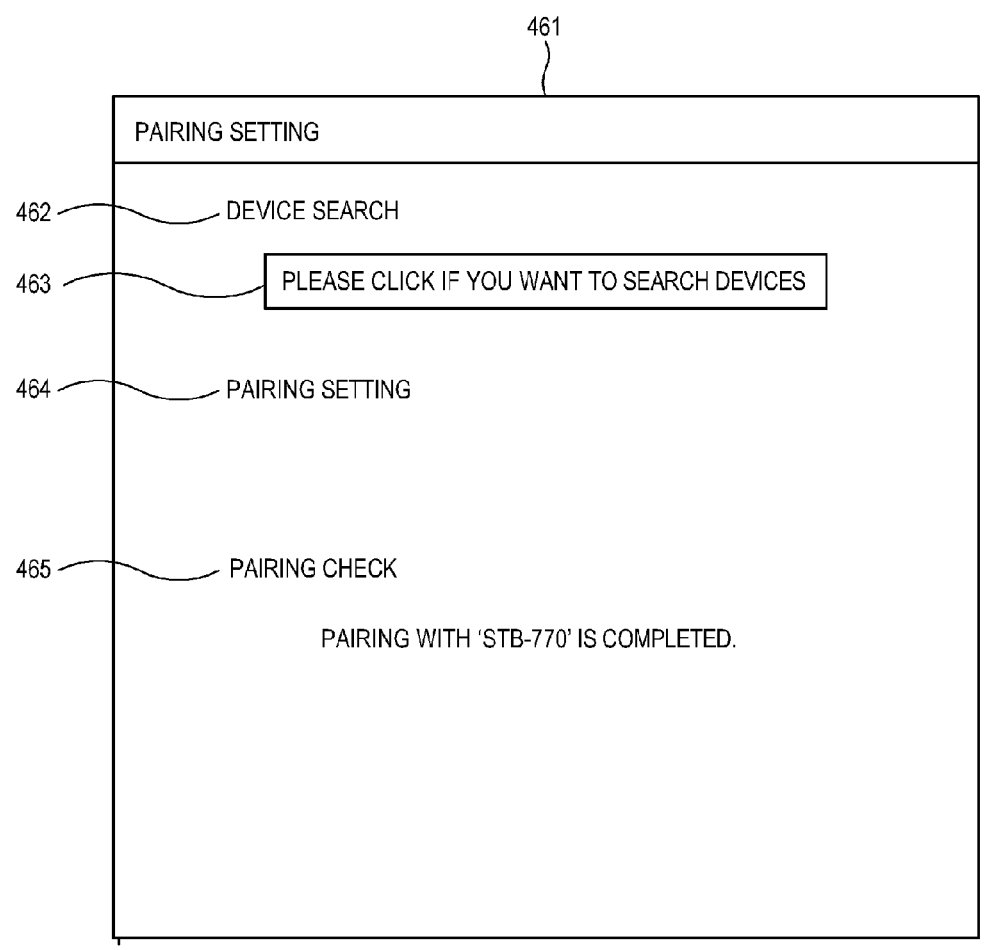

If the authentication signal informing that the input pin code is valid is received from the server 300, the second authentication program checks the pairing connection with the server 300 under control of the second processor 490, and displays the device name and/or address of the server 300 and a message ('pairing is completed') on a pairing check item 465 as shown in FIG. 12.

In the foregoing description, the device search item 462, the pairing setting item 464 and the pairing check item 465 are fulfilled on the setting screen 461, but may be respectively displayed on different screens in accordance with designs.

The second authenticator 460 may be achieved by a separate application instead of the second authentication program, or the second authentication program may be embedded in the operating system for controlling the elements 440, 450, 455, 460, 470, 480 and 490 of the client 400. In the latter case, the setting screen 461 may be achieved to be included in a setting application of a main menu of the client 400. Further, the second authenticator 460 may be achieved by an ASIC designed to fulfill the functions of the second authentication program.

The second storage 470 stores various applications and control programs for implementing the functions provided by the client 400.

Further, the second storage 470 stores data generated by executing various applications and control programs, content reproduced by the application, the device information of the client 400, etc.

Further, the second storage 470 stores information about the pin code, the device name, the address, etc. of the paired server 300 if the pairing connection with the server 300 is set.

Further, the second storage 470 stores the closed-caption capability information of the client 400, which is transmitted together with the broadcast signal request signal to the server 300, under control of the second processor 490 when a user executes the TV player of the signal processor 450. The closed-caption capability information includes the first closed-caption format list where the closed-caption formats supported by the client 400 are listed. For example, as shown in FIG. 13 and FIG. 14, the first closed-caption format list is stored including the supported closed-caption formats (WetVTT, . . . ) if the operating system of the client 400 is iOS 8, and the supported closed-caption formats (TTML, . . . ) if the operating system is Android OS 4.4.2. The closed-caption capability information is transmitted to the sever 300 in the form of the transmission packet as described with reference to FIG. 3 and FIG. 4.

Like the first storage 370, the second storage 470 may be achieved by at least one of a flash memory type, a hard disk type, a multimedia card micro type, a card type memory (e.g., SD or XD memories, etc.), a RAM, a SRAM, a ROM, an EEPROM, a PROM, a magnetic memory, a magnetic disk, and an optical disk.

The second user input 480 is to receive a user's command, and includes a touch screen 481 and a second key input 483.

The touch screen 481 may be mounted to a front side of the display 455. The touch screen 481 senses a position touched by a user's finger when s/he touches a screen displayed on the display 455, for example, the locked screen, the home screen, the application running screen, the menu screen, the message writing screen, the call screen, the Internet screen, the keypad screen, etc. with his/her finger while using the client 400, and transits a touch signal corresponding to the touched position to the second processor 490. The second processor 490 controls the corresponding function and/or elements in response to the touch signal.

The touch screen may be achieved by a resistive type, a capacitive type, a pressure type, etc.

The second key input 483 includes input keys or buttons formed on a front lower side or a lateral side of the case (not shown) of the client 400. The key input 483 generates a key signal related to the function control of the client 400 in response to a user's input using the input keys or buttons, and transmits the generated key signal to the second processor 490. The key signal includes a power on/off signal, a volume control signal, etc. The second processor 490 controls the corresponding function and/or elements in response to the key signal input through the key input 483.

The second processor 490 controls general operations of the client 400.

Further, the second processor 490 controls the second authenticator 460 in response to a user's input using the second user input 480 as described with regard to the second authenticator 460, and performs the pairing connection between the client 400 and the server 300.

That is, as shown in FIG. 5 and FIG. 9 to FIG. 12, the second processor 490 generates the pairing request signal and transmits it to the server 300 through the second communicator 440 when a user presses the device search button 463 of the device search item 462 on the setting screen 461 (see FIG. 9). Further, the second processor 490 generates the response message and transmits it to the server 300 through the second communicator 440 when a user inputs the pin code through the pin code input window 467 of the pairing check item 465 activated by receiving the authentication challenge from the server 300 (see FIG. 11). Further, the second processor 490 checks the pairing connection with the server 300 when the authentication signal is received from the server 300, and displays the device name and/or address of the server 300 and the message ('pairing is completed') on the pairing check item 465 (see FIG. 12). Thus, the client 400 can easily exchange the broadcast signal, the closed-caption data, a variety of pieces of information including such as the closed-caption capability information, etc. with the server 300.

Further, if a user executes the TV player of the signal processor 450 as shown in FIG. 6 after pairing the server 300 and the client 400, the second processor 490 transmits the broadcast signal request signal of making a request for the broadcast signal, together with the closed-caption capability information of the client 400, to the server 300. At this time, the closed-caption capability information may be transmitted to the server 300 simultaneously with or directly after pairing the client 400 and the server 300 before executing the TV player.

Further, as described with regard to the signal processor 450, the second processor 490 controls the signal processor 450 to process the broadcast signal and the closed-caption data, received from the server 300, so that the processed image and the closed-caption can be displayed on the display 455.

The second processor 490 may operate by executing the operating system. The operating system may include iOS, Android OS, etc.

Further, in accordance with designs, the second processor 490 may further include a nonvolatile memory such as a flash memory or the like for storing the operating system, and/or a volatile memory such as a DDR for loading at least a part of the stored operating system so as to be quickly accessed by the processor or CPU. At this time, if the second processor 490 does not include the nonvolatile memory, the operating system may be stored in the second storage 470.

In the foregoing embodiment, the client 400 is the smart phone or the like mobile device, but not limited thereto. For example, the client 400 may be achieved by another display apparatus such as a digital TV. In this case, the display apparatus operates on the same configuration and principle except that the operating system is changed into Tizen, Netcast, iOS, Android OS, etc. in accordance with the manufacturers.

Figure 15:
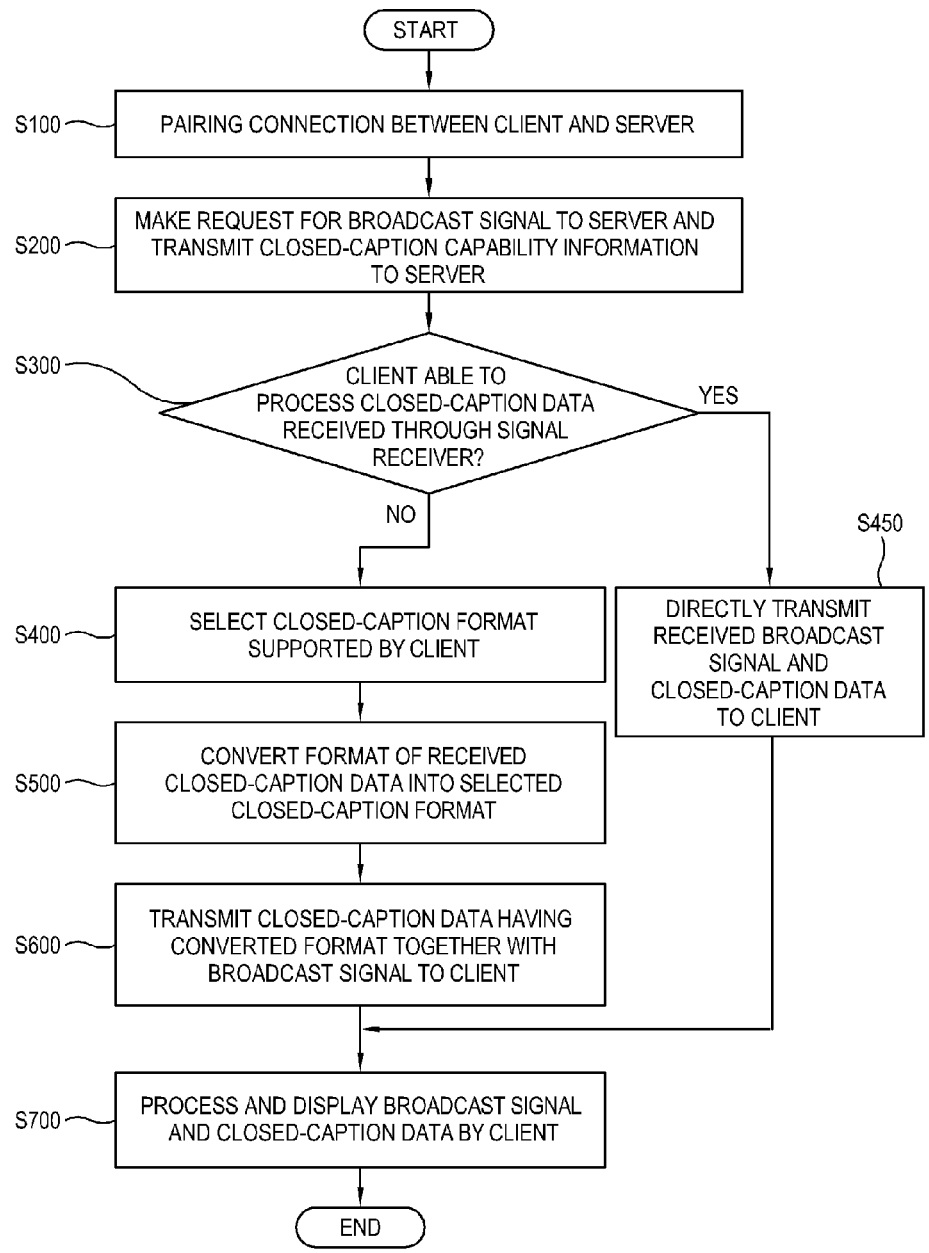
FIG. 15 is a flowchart showing a closed-caption providing process of the broadcast receiving system according to an exemplary embodiment.

A closed-caption providing method of the broadcast receiving system 100 configured as described above according to an exemplary embodiment will be described in detail with reference to FIG. 15.

Below, it will be assumed that the server 300 is the set-top box for receiving the broadcast signal of the content and the closed-caption data having a format of WebVTT from the information providing source 200 in the TV mode, and the client 400 is the smart phone having Android OS.

To receive and view the broadcast signal of the content from the server 300 through the client 400, a user sets the pairing connection between the client 400 and the server 300 by the foregoing method through the first and second authenticators 360 and 460, and pairs the client 400 and the server 300 (S100).

If a user executes the TV player of the signal processor 450 in the client 400 after pairing the client 400 and the server 300, the second processor 490 of the client 400 transmits the broadcast signal request signal making a request for the broadcast signal, together with the closed-caption capability information of the client 400, to the server 300 (S200). At this time, the closed-caption capability information may be transmitted to the server 300 directly after or simultaneously with paring the client 400 and the server 300 before executing the TV player.

The first processor 390 of the server 300 determines whether the client 400 is able to process the closed-caption data received through the signal receiver 330 of the server 300, based on the closed-caption capability information received from the client 400 (S300).

If it is determined in the operation S300 that the client 400 is unable to process the received closed-caption data (S300-N), the first processor 390 selects one among the supported closed-caption formats of the received closed-caption capability information as the closed-caption format supported by the client 400 (S400).

The first processor 390 reads the closed-caption conversion data, for converting the format of the received closed-caption data into the selected closed-caption format, from the closed-caption format conversion table stored in the first storage 370, and converts the format of the received closed-caption data into the selected closed-caption format by the converter 350 (S500), and transmits the closed-caption data having the converted format, together with the broadcast signal, to the client 400 (S600). The converting operation S500 and the transmitting operation S600 may be performed in real time.

The second processor 490 of the client 400 controls the signal processor 450 to process the broadcast signal and closed-caption data received from the server 300, and displays the processed image and closed-caption on the display 455 (S700).

On the other hand, if it is determined in the operation S300 that the client 400 is able to process the received closed-caption data (S300-Y), the first processor 390 directly transmits the received broadcast signal and closed-caption data to the client 400 without converting the format of the closed caption data received through the signal receiver 330 (S450), and then performs the operation S700.

Such operations are performed until the broadcast signal is not transmitted from the server 300 to the client 400 or until a user ends the pairing connection between the TV player or client 400 and the server 300.

Figure 16:
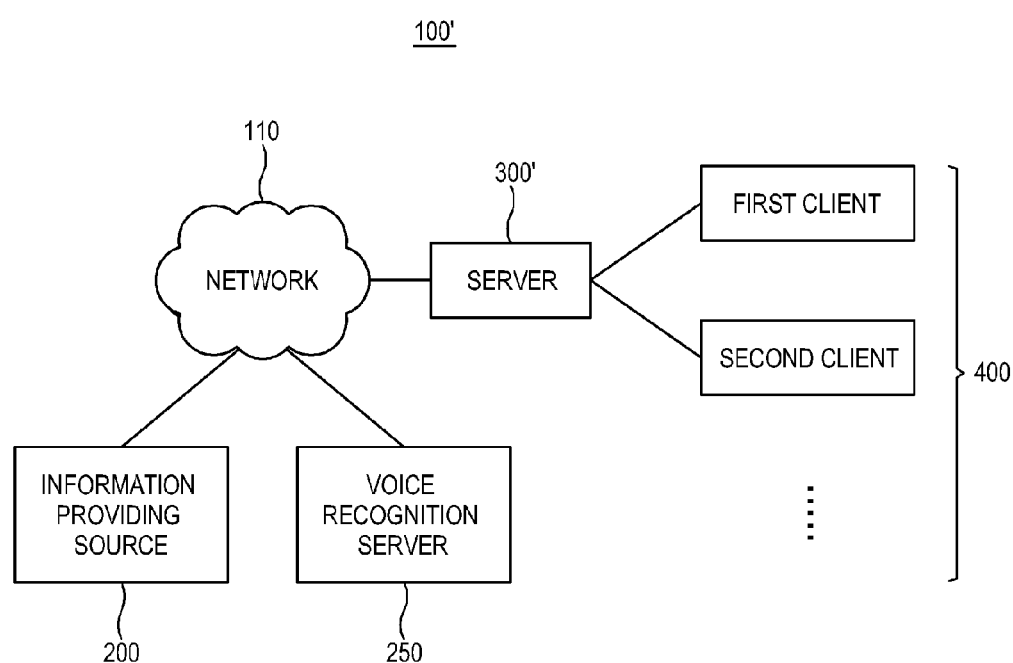
FIG. 16 is a block diagram of a broadcast receiving system according to another exemplary embodiment.

FIG. 16 is a block diagram of a broadcast receiving system 100' supporting a closed-caption function according to still another exemplary embodiment.

The broadcast receiving system 100' includes an information providing source 200, a voice recognition server 250, a server 300' and a plurality of clients 400.

The broadcast receiving system 100' is the same as the broadcast receiving system 100 shown in FIG. 1 and FIG. 2 except further including a voice recognition server 250 and a closed-caption error determiner (see '355' of FIG. 17) of the server 300'. Therefore, only the voice recognition server 250 and the closed-caption error determiner 355 of the server 300' will be described below.

The voice recognition server 250 is a big data server that provides a voice recognition service, which converts an audio signal from the server 300' into text information and transmits it to the server 300' if the server 300' makes a request for the voice recognition service through the network 110.

The closed-caption error determiner 355 of the server 300' receives a signal making a request for a broadcast signal from the client 400 and determines whether the closed-caption data received in the signal receiver 330 from the information providing source 200 has an error under control of the first processor 390.

If the closed-caption error determiner 355 determines that the closed-caption data has an error, a closed-caption error signal together with the audio signal is output to the first processor 390. The audio signal is separated from the broadcast signal by the demultiplexer (not shown) included in the closed-caption error determiner 355.

The closed-caption error determiner 355 may determine that the closed-caption data has an error if the closed-caption data is not received. Alternatively, the closed-caption error determiner 355 may determine that the closed-caption data has an error if a generation section of the closed-caption data is irregularly unmatched with a generation section of the audio signal by a predetermined percentage for a predetermined period of time, for example, by 50% or higher for 2 minutes.

Further, the determination of whether the closed-caption data has an error may be performed once after receiving the request signal for the broadcast signal from the client 400 or on a predetermined cycle, for example, every 10 minutes. Below, it will be assumed that the determination of whether the closed-caption data has an error is performed once after receiving the request signal for the broadcast signal.

The closed-caption error determiner 355 may be achieved by a closed-caption error determination program having the foregoing functions, or by embedding the closed-caption error determination program in the operating system of the server 300'. In the former case, the closed-caption error determination program may be stored in the first storage 370. Further, alternatively, the closed-caption error determiner 355 may be achieved by an ASIC designed to perform the functions of the closed-caption error determination program.

The first processor 390 transmits an audio signal together with the request signal for the voice recognition service about the closed-caption to the voice recognition server 250 in accordance with a closed-caption error signal output from the closed-caption error determiner 355. Further, the first processor 390 may make a request for the voice recognition service to the voice recognition server 250 like the case of receiving the closed-caption error signal even when a user issues a command on the voice recognition service about the closed-caption through the first user input 380.

The voice recognition server 250 extracts a text from the audio signal by applying voice recognition to the audio signal received from the server 300' based on a voice recognition rule of an internal voice recognition database, and transmits text information including the extracted text to the server 300'.

The first processor 390 transmits the text information received from the voice recognition server 250 to the converter 350. Under control of the first processor 390, the converter 350 converts the received text information into the closed-caption data having a format supported by the selected client 400 based on the closed-caption capability information by the same method as described with reference to FIG. 6. Alternatively, if the voice recognition server 250 supports the conversion of text information into a required forma, the conversion of the closed-caption format may be performed by not the converter 350 but the voice recognition server 250. In this case, the first processor 390 provides the closed-caption format information supported by the selected client 400 based on the closed-caption capability information when the request for the voice recognition service is made to the voice recognition server 250, and directly receives the closed-caption data having the format converted by the voice recognition server 250 from the voice recognition server 250.

Like the closed-caption error determiner 355, the converter 350 may be achieved by the closed-caption format conversion program for converting the closed-caption, or by embedding the closed-caption format conversion program in the operating system of the server 300'. In the former case, the closed-caption format conversion program may be stored in the first storage 370. Alternatively, the converter 350 may be achieved by an ASIC designed to perform the functions of the closed-caption format conversion program 의 function.

The first processor 390 transmits the closed-caption data having the converted format, together with the broadcast signal, to the client 400 through the first communicator 340. The second processor 490 of the client 400 processes the broadcast signal and the closed-caption data having the converted format, received through the second communicator 440, by the signal processor 450, and displays the processed image and the closed-caption on the display 455.

Figure 18:
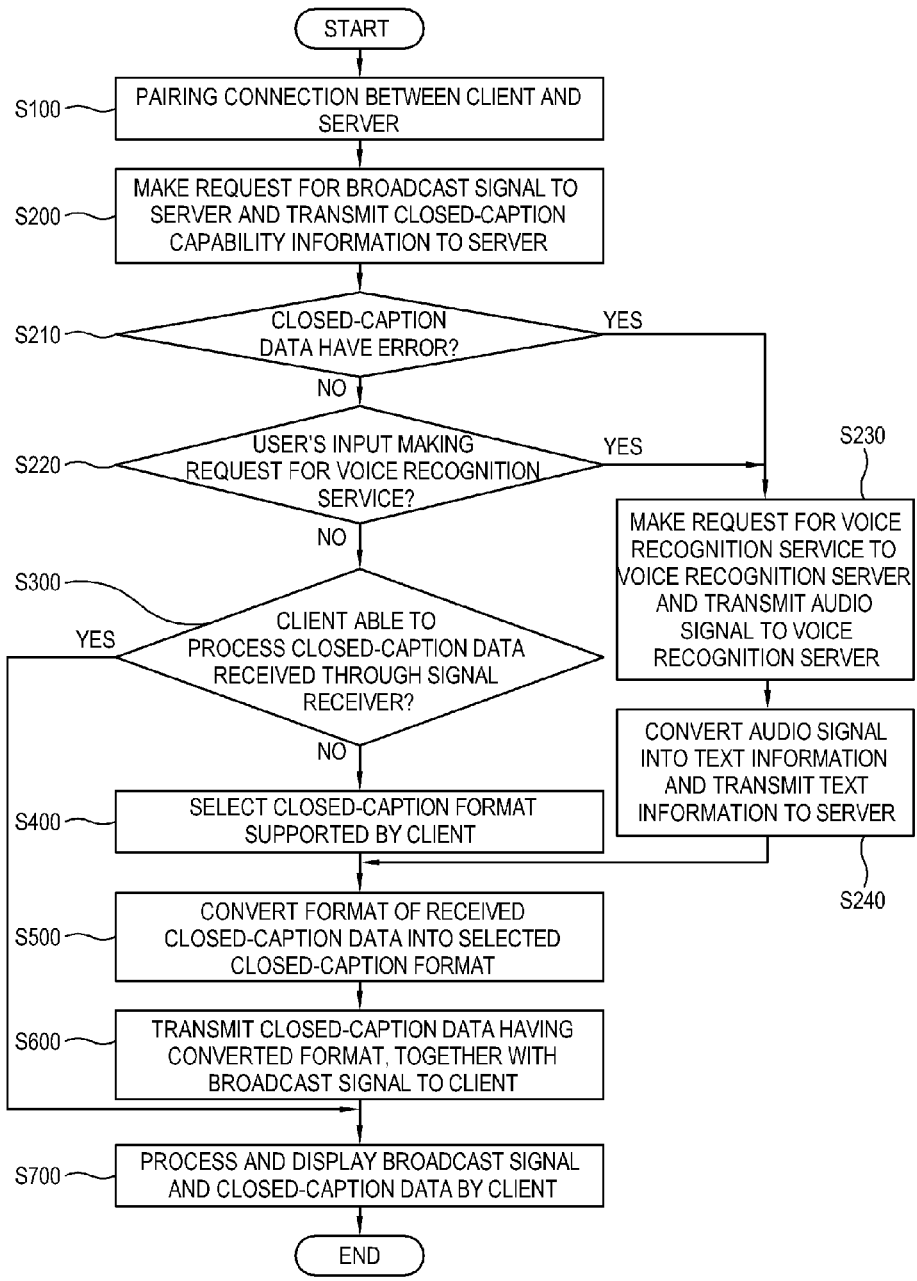
FIG. 18 is a flowchart showing a closed-caption providing process of a broadcast receiving system according to still another exemplary embodiment.

A closed-caption providing method of the broadcast receiving system 100' configured according to still another exemplary embodiment will be described below with reference to FIG. 18.

The closed-caption providing method of the broadcast receiving system 100' includes the same operations as those (S100-S700) in the closed-caption providing method of the broadcast receiving system 100 described with reference to FIG. 15 except the operations (S210-S240) of obtaining the text information from the audio signal by the voice recognition server 250 if the closed-caption data has an error and there is a user's request for the voice recognition service. Hence, only the operations S210-S250 will be described below.

After the operation S200, the first processor 390 of the server 300 uses the closed-caption error determiner 355 to determine whether there is an error in the closed-caption data received from the information providing source 200 through the signal receiver 330 (S210).

If it is determined in the operation S210 that there is no error in the closed-caption data (S210-N), the first processor 390 determines whether there is a user's input making a request for the voice recognition service about the closed-caption due to reception of no closed-caption data (S220).

If it is determined in the operation S220 that there is no user's input (S220-N)), the operations following the operation S300 are performed like the closed-caption providing method of the broadcast receiving system 100 described with reference to FIG. 15.

On the other hand, if it is determined in the operation S220 that there is a user's input (S220-Y) or if it is determined in the operation S210 that the closed-caption data has an error (S210-Y), the first processor 390 transmits a request signal for the voice recognition service and the received audio signal to the voice recognition server 250 (S230).

The voice recognition server 250 converts an audio signal received from the server 300' into text information and transmits the converted audio signal to the server 300' (S240).

The first processor 390 transmits the text information received from the voice recognition server 250 to the converter 350 and performs the operations following the operations S500.

Figure 19:
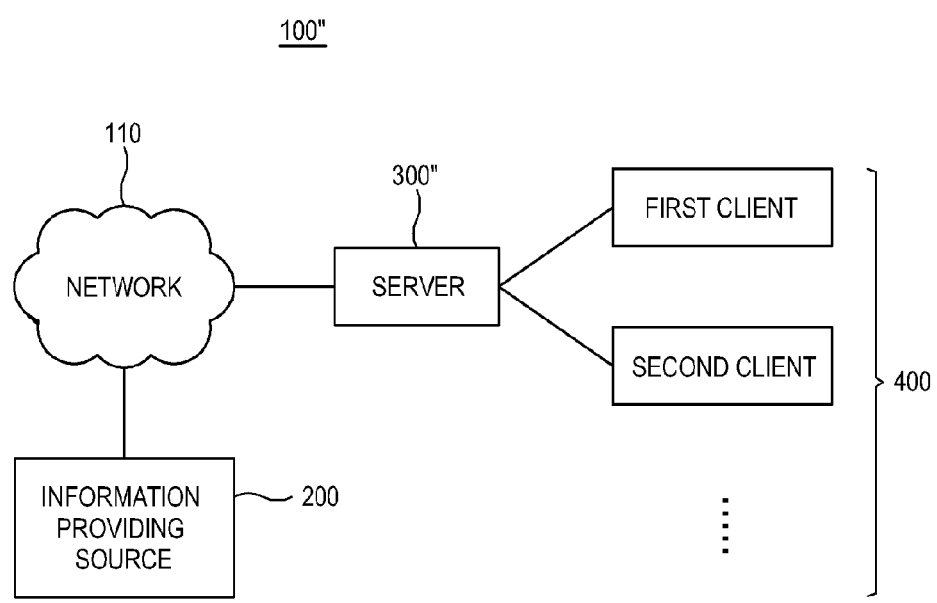
FIG. 19 is a block diagram of a broadcast receiving system according to still another exemplary embodiment.

FIG. 19 is a block diagram of a broadcast receiving system 100" supporting a closed-caption function according to still another exemplary embodiment.

The broadcast receiving system 100" includes an information providing source 200, a server 300", and a plurality of clients 400.

Figure 20:
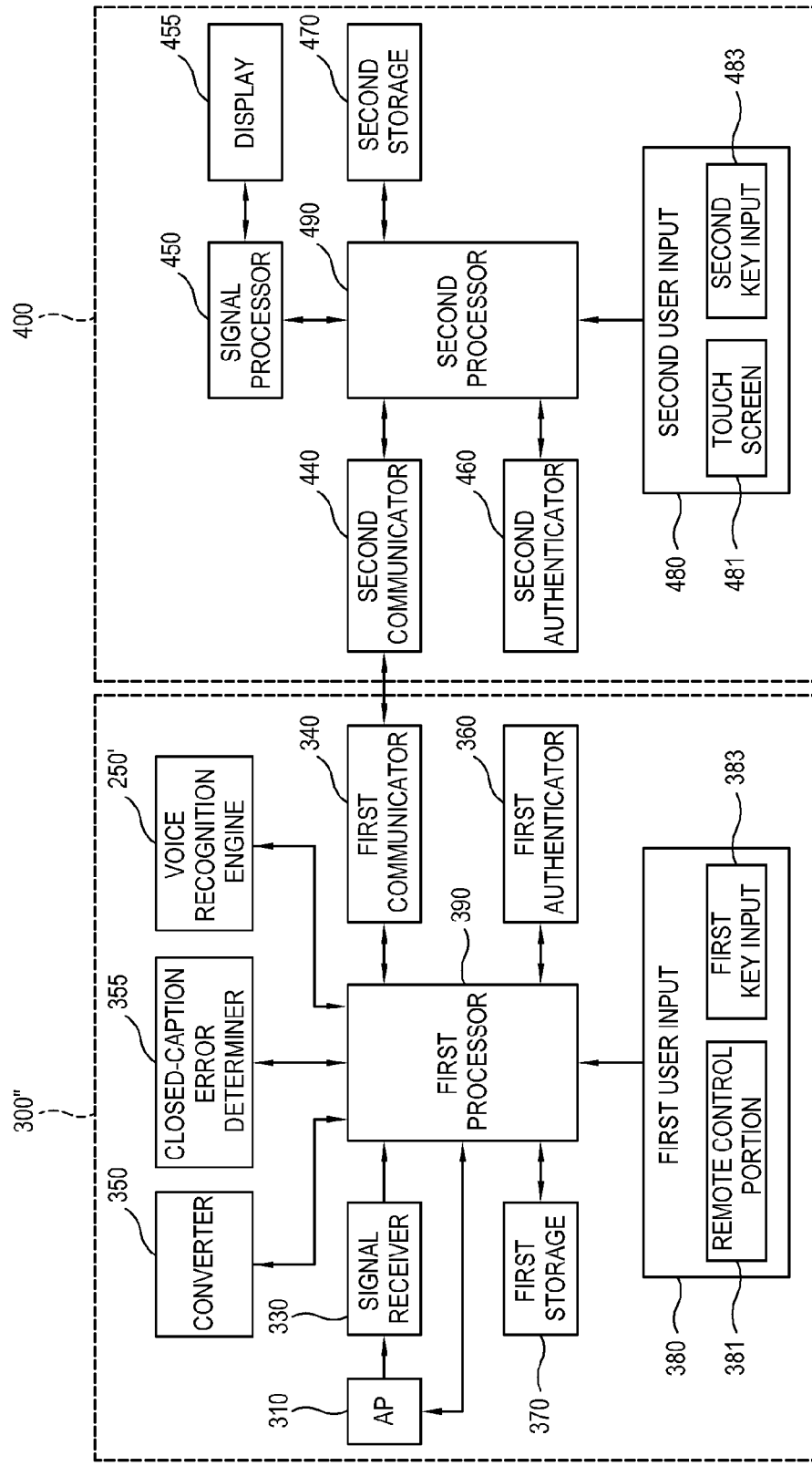
FIG. 20 is a block diagram of a server and a client in the broadcast receiving system of FIG. 19.

The broadcast receiving system 100" is the same as the broadcast receiving system 100' described with reference to FIG. 16 and FIG. 17 except that the system 300" includes a voice recognition engine (see 250' of FIG. 20) having the same function as the voice recognition server 250 instead of the voice recognition server 250.

Figure 17:
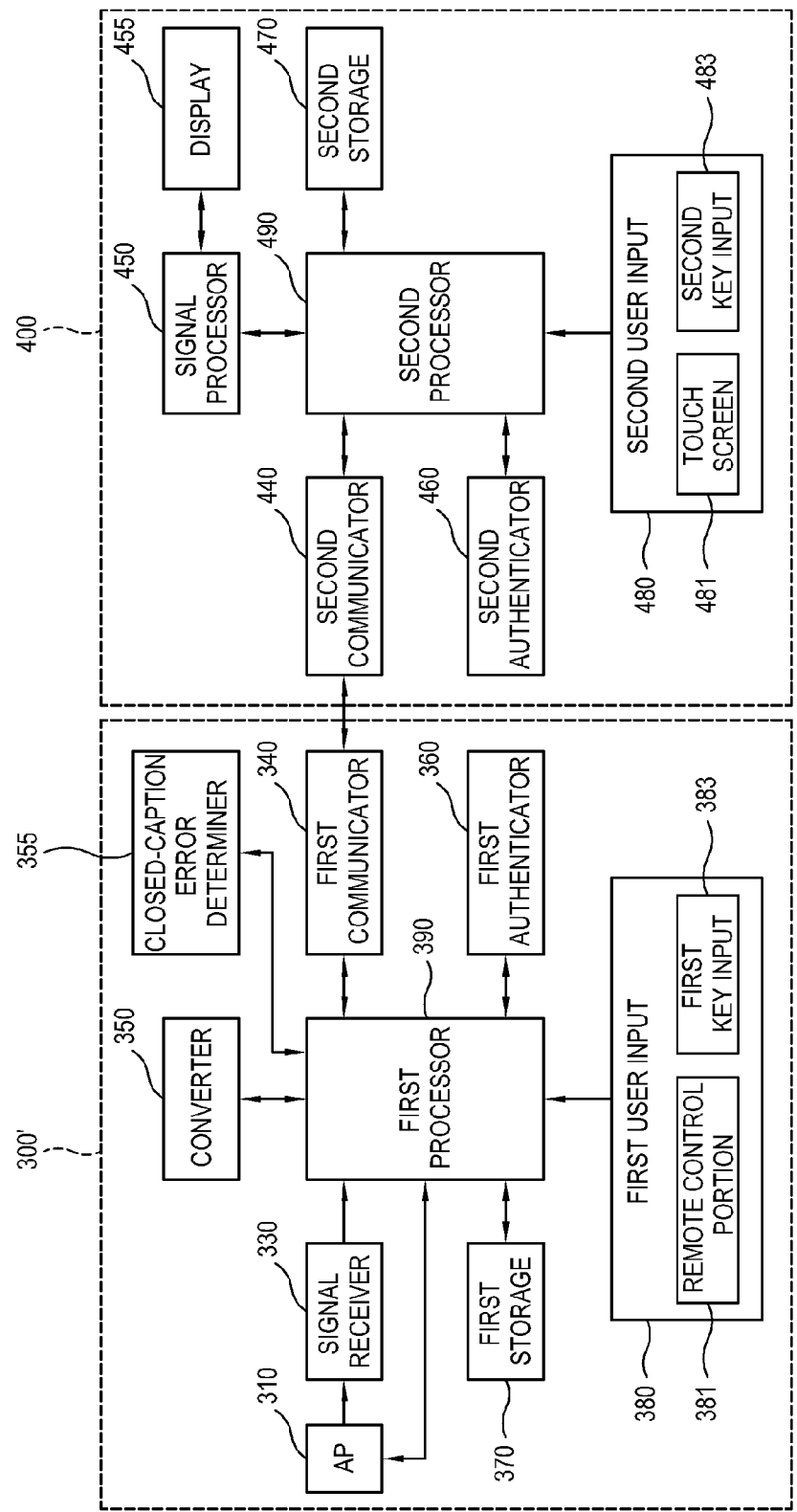
FIG. 17 is a block diagram of a server and a client in the broadcast receiving system of FIG. 16.

That is, the broadcast receiving system 100" is the same as that of FIG. 16 and FIG. 17 except that text information is obtained by the internal voice recognition engine 250' rather than by transmitting the audio signal to the external the voice recognition server if the closed-caption error determiner 355 of the server 300" determines that the received closed-caption data has an error or if there is a user's input through the user input 380 to make a request for the voice recognition service due to reception of no closed-caption data. Therefore, repetitive descriptions about the configurations and operations of the broadcast receiving system 100" will be avoided.

As described above, there are provided the closed-caption support server 300, 300', 300" and client 400 according to exemplary embodiments, the system 100, 100', 100" having the same, and the closed caption-providing method thereof, in which the server 300, 300', 300" determines the closed-caption capability of the client and provides the client 400 with the closed-caption data having the format suitable for the closed-caption capability of the client 400. In result, it is possible to prevent conventional problems that the received closed-caption data is not processed due to a mismatch between the format of the closed-caption data supported by the client and the format of the closed-caption data received from the server as the server unilaterally offers the closed-caption data having the preset format to the client. Therefore, it is possible to solve the problem that a hearing-impaired person, a foreigner and the like user who needs the closed-caption service cannot use the closed-caption function of the client due to incompatibility of the closed-caption between the server and the client.

Although a few exemplary embodiments have been shown and described, it will be appreciated by those skilled in the art that changes may be made in these exemplary embodiments without departing from the principles and spirit of the invention. Therefore, the foregoing has to be considered as illustrative only. The scope of the invention is defined in the appended claims and their equivalents. Accordingly, all suitable modification and equivalents may fall within the scope of the invention.

What is claimed is:

1. A content receiving apparatus comprising:
a signal receiver to receive a video signal and closed-caption data of the video signal;
a communicator to communicate with a display apparatus; and
a processor configured:
to receive characteristic information of the display apparatus from the display apparatus via the communicator, the characteristic information including at least one of operating system (OS) information on a type or version of an OS of the display apparatus or product identification information of the display apparatus;
to determine whether the received closed-caption data has an error;
in response to determining that the received closed-caption data does not have the error, to determine whether the received closed-caption data is supported by the display apparatus based on the received characteristic information;
in response to determining that the received closed-caption data is not supported by the display apparatus, to select a closed-caption format supported by the display apparatus based on the received characteristic information;
to convert a closed-caption format of the received closed-caption data into the selected closed-caption format in real time;
to transmit the closed-caption data having the converted closed-caption format together with the video signal to the display apparatus; and
in response to determining that the received closed-caption data has the error, to transmit to the display apparatus, text information which is converted from an audio signal corresponding to the video signal.

2. The content receiving apparatus according to claim 1, wherein the processor determines a closed-caption format supported by the display apparatus based on the received characteristic information.

3. The content receiving apparatus according to claim 2, wherein the characteristic information comprises a first closed-caption format list comprising closed-caption formats supported by the display apparatus.

4. The content receiving apparatus according to claim 3, wherein the supported closed-caption formats are varied depending on kinds and versions of an operating system of the display apparatus.

5. The content receiving apparatus according to claim 3, wherein the characteristic information is received in a form of a transmission packet comprising at least one of device information of the display apparatus, operating system information containing the kinds and versions of the operating system of the display apparatus, and the closed-caption formats supported by the operating system.

6. The content receiving apparatus according to claim 3, further comprising a storage configured to store a closed-caption format conversion table to convert the format of the received closed-caption data into one of the closed-caption formats included in the first closed-caption format list.

7. The content receiving apparatus according to claim 6, wherein the processor is configured to use the closed-caption format conversion table to convert the closed-caption format of the closed-caption data into one of the closed-caption formats included in the first closed-caption format list.

8. The content receiving apparatus according to claim 6, wherein the processor is configured to authenticate the display apparatus by setting a pairing connection between the display apparatus and the content receiving apparatus.

9. The content receiving apparatus according to claim 8, wherein the processor is configured to determine whether the received closed-caption data is supported by the display apparatus based on the operating system information or the product identification information of the display apparatus when the pairing connection is set.

10. The content receiving apparatus according to claim 9, wherein the product identification information comprises at least one of a manufacturer, a product name, a model name and a product number.

11. The content receiving apparatus according to claim 9, wherein the storage further stores a second closed-caption format list comprising the closed-caption formats supported by the display apparatus in accordance with the product identification information of the display apparatus.

12. The content receiving apparatus according to claim 11, wherein the processor uses the second closed-caption format list to select one of the closed-caption formats corresponding to the product identification information of the display apparatus, and converts the closed-caption format of the closed-caption data into the selected closed-caption format.

13. The content receiving apparatus according to claim 1, wherein the processor generates a closed-caption error signal when the processor determines that there is an error.

14. The content receiving apparatus according to claim 13, wherein the processor determines that the closed-caption data has an error when the closed-caption data is not received in the signal receiver.

15. The content receiving apparatus according to claim 1, wherein the processor determines that the closed-caption data has an error when a generation section of the closed-caption data is not matched with a generation section of a corresponding audio signal by a predetermined percentage for a predetermined period of time.

16. The content receiving apparatus according to claim 14, wherein when the closed-caption error signal is generated, the processor is configured to transmit an audio signal corresponding to the video signal to one of an external voice recognition server and an internal voice recognition engine so that the audio signal is converted into text information having a format compatible with the display apparatus.

17. The content receiving apparatus according to claim 1, wherein the processor is configured to transmit an audio signal corresponding to the video signal to one of an external voice recognition server and an internal voice recognition engine so that the audio signal is converted into text information having a format compatible with display apparatus when there is a user's input making a request for a voice recognition service.

18. The content receiving apparatus according to claim 1, wherein the content receiving apparatus comprises one among a set-top box, a personal computer and a notebook computer.

19. A display apparatus comprising:
a communicator to communicate with a content receiving apparatus;
a display to display an image; and
a processor configured to transmit characteristic information of the display apparatus to the content receiving apparatus through the communicator, the characteristic information including at least one of operating system (OS) information on a type or version of an OS of the display apparatus or product identification information of the display apparatus, and to receive a video signal and corresponding closed-caption data from the content receiving apparatus so that the video signal and the closed-caption data is displayed on the display,
wherein the content receiving apparatus determines whether the received closed-caption data has an error; in response to determining that the received closed-caption data does not have the error, converts a closed-caption format of the received closed-caption data into a closed-caption format corresponding to the characteristic information in real time to transmit the closed-caption data having the converted closed-caption format together with the video signal to the display apparatus; and in response to determining that the received closed-caption data has the error, transmits to the display apparatus, text information which is converted from an audio signal corresponding to the video signal.

20. The display apparatus according to claim 19, wherein the characteristic information comprises a first closed-caption format list comprising closed-caption formats supported by the content receiving apparatus.

21. The display apparatus according to claim 20, wherein the supported closed-caption formats are varied depending on kinds and versions of the operating system of the content receiving apparatus.

22. The display apparatus according to claim 20, wherein the characteristic information is transmitted in a form of a transmission packet comprising at least one of product identification information of the content receiving apparatus, operating system information containing the kinds and versions of the operating system of the content receiving apparatus, and the closed-caption formats supported by the operating system.

23. The display apparatus according to claim 20, further comprising a storage configured to store the first closed-caption format list of the characteristic information.

24. The display apparatus according to claim 19, wherein the processor is configured to set a pairing connection between the display apparatus and the content receiving apparatus.

25. The display apparatus according to claim 24, wherein the processor is configured to transmit the product identification information to determine characteristics of the display apparatus to the content receiving apparatus when the processor set the pairing connection.

26. The display apparatus according to claim 25, wherein the product identification information comprises at least one of a manufacturer, a product name, a model name and a product number.

27. The display apparatus according to claim 19, wherein the display apparatus comprises at least one of a mobile device and a television.

28. A system comprising:
   a content receiving apparatus comprising:
      a signal receiver to receive a video signal and closed-caption data corresponding to the video signal;
      a communicator to communicate with a display apparatus; and
      a processor configured:
         to receive characteristic information of the display apparatus from the display apparatus via the communicator, the characteristic information including at least one of operating system (OS) information on a type or version of an OS of the display apparatus or product identification information of the display apparatus;
         to determine whether, the received closed-caption data has an error;
         in response to determining that the received closed-caption data does not have the error, to determine whether the received closed-caption data is supported by the display apparatus based on the characteristic information;
         in response to determining that the received closed-caption data is not supported by the display apparatus, to select a closed-caption format supported by the display apparatus based on the characteristic information, to convert a closed-caption format of the received closed-caption data into the selected closed-caption format in real time;
         to transmit the closed-caption data having the converted closed-caption format together with the video signal to the display apparatus; and
         in response to determining that the received closed-caption data has the error, to transmit to the display apparatus, closed-caption data comprising text information which is converted from an audio signal corresponding to the video signal; and
   the display apparatus comprising:
      a communicator to communicate with the content receiving apparatus;
      a display to display an image; and
      a processor configured to transmit the characteristic information of the display apparatus to the content receiving apparatus through the communicator, and to receive the video signal and the corresponding closed-caption data, which has a closed-caption format converted by the content receiving apparatus into a closed-caption format corresponding to the characteristic information, from the content receiving apparatus so that the video signal and the corresponding closed-caption data is displayed on the display.

29. A closed-caption providing method of a system comprising a content receiving apparatus that receives a video signal, an audio signal and closed-caption data of content, and a display apparatus that communicates with the content receiving apparatus, the method comprising:

determining, by the content receiving apparatus, characteristic information of the display apparatus, the characteristic information including at least one of operating system (OS) information on a type or version of an OS of the display apparatus or product identification information of the display apparatus;

determining, by the content receiving apparatus, whether the received closed-caption data has an error;

in response to determining that the received closed-caption data does not have the error, converting, by the content receiving apparatus, a closed-caption format of the closed-caption data into a closed-caption format compatible with the characteristics of the display apparatus based on the determined characteristic information of the display apparatus in real time and transmitting the closed-caption data having the converted closed-caption format, together with the video signal, to the display apparatus; and in response to determining that the received closed-caption data has the error, transmitting, by the content receiving apparatus, to the display apparatus, closed-caption data comprising text information which is converted from an audio signal corresponding to the video signal; and displaying, by the display apparatus, an image comprising video of the video signal and a closed-caption, by processing the video signal and the closed-caption data received from the content receiving apparatus.

30. The method according to claim 29, wherein the determining comprises:
   transmitting characteristic information of the display apparatus to the content receiving apparatus; and
   determining whether the display apparatus is able to process the closed-caption data received from the content receiving apparatus, based on the received characteristic information.

31. The method according to claim 30, wherein the determining whether the display apparatus is able to process the closed-caption data comprises:
   checking whether the closed-caption format of the received closed-caption data belongs to a first closed-caption format list of the characteristic information; and
   determining that the display apparatus is able to process the received closed-caption data when the closed-caption format of the received closed-caption data belongs to the first closed-caption format list, and otherwise determining that the display apparatus is unable to process the received closed-caption data.

32. The method according to claim 31, wherein the converting comprises:
   selecting a closed-caption format to be converted based on the received characteristic information when it is determined that the display apparatus is unable to process the received closed-caption data; and
   converting the closed-caption format of the received closed-caption data into the selected closed-caption format.

33. The method according to claim 32, wherein the converting the closed-caption format into the selected closed-caption format comprises: using a closed-caption format conversion table to convert the closed-caption format of the received closed-caption data into the selected closed-caption format.

34. The method according to claim 31, wherein the transmitting comprises:

transmitting the received closed-caption data together with the video signal to the display apparatus without converting the closed-caption format of the received closed-caption data when it is determined that the display apparatus is able to process the received closed-caption data.

35. The method according to claim 29, further performing a pairing connection between the display apparatus and the content receiving apparatus.

36. The method according to claim 35, wherein the determining comprises determining the characteristics of the display apparatus based on the product identification information of the display apparatus transmitted from the display apparatus to the content receiving apparatus when the pairing connection is set.

37. The method according to claim 29, further comprising:
   determining whether the received closed-caption data has an error and generating a closed-caption error signal when it is determined that there is an error;
   transmitting the audio signal to one of an external voice recognition server and an internal voice recognition engine so that the audio signal is converted into text information when the closed-caption error signal is generated; and
   converting the text information into a format compatible with the characteristics of the display apparatus.

38. The method according to claim 37, wherein the generating comprises determining that the closed-caption data has an error when the closed-caption data is not received or when a generation section of the closed-caption data is not matched with a generation section of the audio signal by a predetermined percentage for a predetermined period of time, and generating the closed-caption error signal.

39. The method according to claim 29, further comprising:
   determining when there is a user's input making a request for a voice recognition service;
   transmitting the audio signal to one of an external voice recognition server and an internal voice recognition engine so that the audio signal is converted into text information; and
   converting the text information to have a format compatible with the characteristics of the display apparatus.

40. A server to provide closed-caption data to a client, the server comprising:
   a communicator to receive a broadcast signal request signal and closed-caption capability ("CCC") information from the client, the characteristic information including at least one of operating system (OS) information on a type or version of an OS of the client or product identification information of the client; and
   a processor to control the server to determine whether the received closed-caption data has an error, to, in response to determining that the received closed-caption data does not have the error, control the server to convert a closed-caption format of the closed-caption data into a closed-caption format corresponding to the CCC information received from the client in real time, to control the server to provide the converted closed-caption data to the client along with content corresponding to the converted closed-caption data, and in response to determining that the received closed-caption data has the error, to transmit to the client, closed-caption data comprising text information which is converted from an audio signal corresponding to the broadcast signal.

41. A method of providing closed-caption data from a server to a client, the method comprising:
   determining, by the server, whether received closed-caption data has an error;
   in response to determining that the received closed-caption data does not have the error, determining, by the server, whether closed-caption data is supported by the client based on characteristic information of the client, the characteristic information including at least one of operating system (OS) information on a type or version of an OS of the client or product identification information of the client;
   in response to determining that the received closed-caption data is not supported by the client, converting, by the server, a closed-caption format of the closed-caption data into a closed-caption format compatible with the client based on the characteristic information in real time and providing the converted closed-caption data to the client along with content corresponding to the converted closed-caption data; and
   in response to determining that the received closed-caption data has the error, transmitting, by the server, to the client, closed-caption data comprising text information which is converted from an audio signal corresponding to the content.

42. A system of providing closed-caption data, the system comprising:
   a server comprising:
      a signal receiver to receive a broadcast signal and the closed-caption data;
      a first communicator to communicate with a client; and
      a processor to receive closed-caption capability (CCC) information of the client via the first communicator, the CCC information including at least one of operating system (OS) information on a type or version of an OS of the client or product identification information of the client, to control the server to determine whether the received closed-caption data has an error, to, in response to determining that the received closed-caption data does not have the error, determine whether the received closed-caption data is supported by the client based on the CCC information, to, in response to determining that the received closed-caption data is not supported by the client, determine whether the client is able to process the closed-caption data by checking whether a closed-caption format of the closed-caption data received in the signal receiver belongs to a supported closed-caption format included in the CCC information received from the client, to control the server to convert the closed-caption data into a closed-caption format corresponding to the CCC information received from the client in real time, to control the server to provide the converted closed-caption data together with the broadcast signal to the client and to, in response to determining that the received closed-caption data has the error, transmit to the client, closed-caption data comprising text information which is converted from an audio signal corresponding to the broadcast signal; and the client comprising:

a second communicator to transmit a broadcast signal request signal and CCC information to the server and to receive the broadcast signal and the converted closed-caption data;
a display: and
a processor configured to process the received broadcast signal and the converted closed-caption data or the closed-caption data comprising the text information and to display a video based on the processed broadcast signal and closed-caption data.

* * * * *